US 12,097,799 B2

(12) United States Patent
Maruyama et al.

(10) Patent No.: US 12,097,799 B2
(45) Date of Patent: Sep. 24, 2024

(54) VEHICLE HEADLIGHT

(71) Applicant: KOITO MANUFACTURING CO., LTD., Tokyo (JP)

(72) Inventors: Yuta Maruyama, Shizuoka (JP); Hidetada Tanaka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 184 days.

(21) Appl. No.: 17/798,653

(22) PCT Filed: Feb. 10, 2021

(86) PCT No.: PCT/JP2021/004983
§ 371 (c)(1),
(2) Date: Aug. 10, 2022

(87) PCT Pub. No.: WO2021/162041
PCT Pub. Date: Aug. 19, 2021

(65) Prior Publication Data
US 2023/0151942 A1 May 18, 2023

(30) Foreign Application Priority Data

Feb. 12, 2020 (JP) .................................. 2020-021282
Feb. 12, 2020 (JP) .................................. 2020-021283
May 21, 2020 (JP) .................................. 2020-088951

(51) Int. Cl.
*B60Q 1/24* (2006.01)
*B60Q 1/14* (2006.01)
(Continued)

(52) U.S. Cl.
CPC ........... *B60Q 1/249* (2022.05); *B60Q 1/1415* (2013.01); *F21S 41/30* (2018.01); *F21S 41/663* (2018.01);
(Continued)

(58) Field of Classification Search
CPC .. B60Q 1/085; B60Q 2300/056; B60Q 1/143; B60Q 2300/42; B60Q 1/1423;
(Continued)

(56) References Cited

U.S. PATENT DOCUMENTS

2011/0012511 A1  1/2011  Watanabe
2016/0167566 A1*  6/2016  Tanaka .................. F21S 41/143
                                                 315/82
2018/0106447 A1*  4/2018  Tanaka .................. F21S 41/151

FOREIGN PATENT DOCUMENTS

EP           2328113 A2     6/2011
JP          2009-214801 A   9/2009
(Continued)

OTHER PUBLICATIONS

International Search Report of PCT/JP2021/004983 dated Apr. 13, 2021 [PCT/ISA/210].

*Primary Examiner* — Wei (Victor) Y Chan
(74) *Attorney, Agent, or Firm* — Sughrue Mion, PLLC

(57) ABSTRACT

A vehicle headlight (10) includes a light source unit (30) including a plurality of light emitting elements (35), a reflector (39) that scans light from the plurality of light emitting elements (35) to form a light distribution pattern (350), and a control unit (60). The control unit (60) controls the light source unit (30) such that the light amount of light emitted from some light emitting elements to a predetermined region (AR) overlapping a target object does not change and the light amount of light emitted from other some light emitting elements to the predetermined region (AR) overlapping the target object changes among the light emitting elements that emit light to the predetermined region (AR) overlapping the target object in the superimposition region (PA).

16 Claims, 13 Drawing Sheets

(51) Int. Cl.
  *F21S 41/30* (2018.01)
  *F21S 41/663* (2018.01)
  *F21S 41/675* (2018.01)

(52) U.S. Cl.
  CPC ........ *F21S 41/675* (2018.01); *B60Q 2300/45* (2013.01)

(58) Field of Classification Search
  CPC ............ B60Q 2300/41; B60Q 2300/45; B60Q 2300/112; B60Q 1/04; B60Q 1/2696; B60Q 2300/054
  See application file for complete search history.

(56) References Cited

FOREIGN PATENT DOCUMENTS

| | | |
|---|---|---|
| JP | 2011-110999 A | 6/2011 |
| WO | 2019/073994 A1 | 4/2019 |

\* cited by examiner

VEHICLE HEADLIGHT

CROSS REFERENCE TO RELATED APPLICATIONS

This application is a National Stage of International Application No. PCT/JP2021/004983 filed on Feb. 10, 2021, claiming priority based on Japanese Patent Application No. 2020-021282 filed on Feb. 12, 2020, Japanese Patent Application No. 2020-021283 filed on Feb. 12, 2020, and Japanese Patent Application No. 2020-088951 filed on May 21, 2020.

TECHNICAL FIELD

The present invention relates to a vehicle headlight.

BACKGROUND ART

As a vehicle headlight typified by an automotive headlight, a vehicle headlight capable of changing a light distribution pattern of emitted light is known. For example, Patent Literature 1 below describes a vehicle headlight including a light source unit including a plurality of light emitting elements and a reflector that repeats a periodic motion, and the reflector forms a predetermined light distribution pattern by reflecting and scanning light from the plurality of light emitting elements. Patent Literature 1 below describes changing a light distribution pattern of emitted light by adjusting emission of light from the plurality of light emitting elements.

In addition, conventionally, there is known a vehicle headlight system that detects a light-emitting object that emits light by itself, such as a car ahead, and a retroreflective object that retroreflects light at a predetermined spreading angle without emitting light by itself, such as a road sign. Such a vehicle headlight system is disclosed in Patent Literature 2. The vehicle headlight system disclosed in Patent Literature 2 includes a headlight that alternately repeats light irradiation and non-irradiation, and an imaging unit that captures an image of the front of the self-vehicle at the time of irradiation and at the time of non-irradiation and generates an irradiation image and a non-irradiation image. In addition, the vehicle headlight system includes a detection unit that determines a high luminance portion located in the non-irradiation image as a light-emitting object, and determines a high luminance portion located in the irradiation image but not located in the non-irradiation image as a retroreflective object.
[Patent Literature 1] WO 2019/073994 A
[Patent Literature 2] JP 2011-110999 A

SUMMARY OF INVENTION

A vehicle headlight of the present invention includes: a light source unit configured to include a plurality of light emitting elements; a reflector configured to repeat a periodic motion to reflect light from the plurality of light emitting elements and scan the light to form a predetermined light distribution pattern; and a control unit configured to control the light source unit, in which the predetermined light distribution pattern includes a superimposition region where the light from at least two of the light emitting elements is superimposed on each other, and in a case where a signal indicating that a target object located in front of a vehicle is detected is input from a detection device, the control unit controls the light source unit such that a light amount of light emitted from some light emitting elements to a predetermined region overlapping the target object does not change and a light amount of light emitted from other some light emitting element to the predetermined region overlapping the target object changes among the light emitting elements emitting light to the predetermined region overlapping the target object in the superimposition region.

In the vehicle headlight, the light distribution pattern of the emitted light changes according to the situation in front of the vehicle, and the light amount of light emitted to the target object changes. In addition, in the vehicle headlight, even in a case where the target object is detected, the light amount of light emitted from some light emitting elements to the predetermined region overlapping the target object does not change. Therefore, in the vehicle headlight, even when the light distribution pattern of the emitted light is changed, the light from some light emitting elements is emitted to the target object. When the light irradiates the target object, the difficulty in visually recognizing the target object can be suppressed and the driving can be facilitated as compared with the case where the light distribution pattern of the emitted light changes and the target object is not irradiated with the light. In addition, in the vehicle headlight, the number of light emitting elements that change the light amount of light emitted is smaller than that in a case where the light amount of light emitted from all the light emitting elements that emit light to the predetermined region overlapping the target object is changed. Therefore, with the vehicle headlight, the control of the light source unit by the control unit can be simplified as compared with such a case. Note that, for example, in a case where the target object is detected by the detection device and the target object is a human such as a pedestrian, the light amount of light emitted to the human changes. For example, when the light amount of light emitted to the human increases, in the vehicle headlight, the human can be easily visually recognized and the driving can be facilitated as compared with the case where the light amount of light emitted to the human does not change. In addition, in a case where the target object is detected by the detection device and the target object is a retroreflective object such as a sign, the light amount of light emitted to the retroreflective object changes. In a case where the retroreflective object reflects the light from the vehicle headlight, the intensity of reflected light from the retroreflective object to the self-vehicle tends to increase as the intensity of light emitted to the retroreflective object increases. For example, when the light amount of light emitted to the retroreflective object is reduced, the intensity of light to the retroreflective object is suppressed and the intensity of reflected light can be suppressed as compared with the case where the light amount of light emitted to the retroreflective object does not change. Therefore, in the vehicle headlight, impartment of glare to the driver of the self-vehicle can be suppressed, and driving can be facilitated.

The width of the predetermined region in the left-right direction overlapping the target object may change according to the distance between the vehicle and the target object.

From the viewpoint of the driver, the target object looks larger as the distance between the vehicle and the target object is shorter. Therefore, with the above configuration, the light amount of light emitted to the target object can be appropriately changed as compared with the case where the width of the predetermined region in the left-right direction in which the light amount of emitted light changes does not change according to the distance between the vehicle and the target object.

In a case where the target object is a human, the control unit may control the light source unit such that the light amount of light emitted from the other some light emitting elements to the predetermined region overlapping the target object increases.

With such a configuration, the human can be easily visually recognized and the driving can be facilitated as compared with the case where the light amount of light emitted to the human such as a pedestrian does not change.

In a case where the target object is a retroreflective object, the control unit may control the light source unit such that the light amount of light emitted from the other some light emitting elements to the predetermined region overlapping the target object decreases.

With such a configuration, impartment of glare to the driver of the self-vehicle can be suppressed and the driving can be facilitated as compared with the case where the light amount of light emitted to the retroreflective object does not change.

The control unit may control the light source unit such that the light amount of light emitted from the other some light emitting elements to the predetermined region overlapping the target object changes according to the distance between the vehicle and the target object.

With such a configuration, the light amount of light emitted to the target object changes according to the distance between the vehicle and the target object. The driver tends to have difficulty in visually recognizing the human as the distance between the vehicle and the human is longer. Therefore, for example, the farther the distance between the vehicle and the human, the larger the light amount of light emitted to the human. In this case, in the vehicle headlight, the human can be easily visually recognized as compared with the case where the light amount of light emitted to the human does not change according to the distance between the vehicle and the human. In addition, in a case where the retroreflective object reflects the light from the vehicle headlight, the intensity of reflected light from the retroreflective object to the self-vehicle tends to increase as the distance between the self-vehicle and the retroreflective object is shorter. Therefore, for example, the closer the distance between the vehicle and the retroreflective object, the smaller the light amount of light emitted to the retroreflective object. In this case, in the vehicle headlight, impartment of glare to the driver of the self-vehicle can be suppressed as compared with the case where the light amount of light emitted to the retroreflective object does not change according to the distance between the vehicle and the retroreflective object.

In a case where the target object is a retroreflective object and the control unit controls the light source unit such that the light amount of light emitted from the other some light emitting elements to the predetermined region overlapping the target object is reduced, the control unit may control the light source unit such that the light amount of light emitted from the other some light emitting elements to the predetermined region overlapping the target object is reduced according to the intensity of light from the target object toward the vehicle.

With such a configuration, the impartment of glare to the driver of the self-vehicle can be appropriately suppressed.

Alternatively, the control unit may control the light source unit such that the light amount of light emitted from the other some light emitting elements to the predetermined region overlapping the target object decreases as the angle formed by a traveling direction of the vehicle and the direction from the vehicle toward the target object decreases.

In general, in a light distribution pattern of light emitted from a vehicle headlight, the intensity of light tends to increase to a center side. Therefore, as the angle between the traveling direction of the vehicle and the direction from the vehicle toward the target object decreases, the intensity of light emitted to the target object tends to increase. Therefore, for example, by controlling the light source unit such that the smaller the angle is, the smaller the light amount of light emitted to the predetermined region overlapping the retroreflective object, which is a target object, the impartment of glare to the driver of the self-vehicle can be appropriately suppressed.

When the control unit controls the light source unit such that the light amount of light emitted from the other some light emitting elements to the predetermined region overlapping the target object changes according to the distance between the vehicle and the target object or the intensity of light from the retroreflective object toward the vehicle, the control unit may change the number of the other some light emitting elements to change the light amount of light emitted from the other some light emitting elements to the predetermined region overlapping the target object in a case where the number of the light emitting elements that emit light to the predetermined region overlapping the target object is three or more.

The reflector may be a rotary reflector that reflects the light from the plurality of light emitting elements while rotating.

A determination unit that determines whether the target object satisfies a predetermined requirement that a light amount of reflected light from the target object is equal to or more than a predetermined value in a case where a signal indicating a state of the target object is input from the detection device is further provided, in which each scanning region through which a spot of light from each light emitting element scanned by the reflector in the predetermined light distribution pattern passes is divided into a pair of end portions that includes an end in a scanning direction and is equal to or more than a width of the spot in the scanning direction and a center portion sandwiched by the pair of end portions, each of the scanning regions is arranged to be displaced in the scanning direction, a part of the center portion of each of the scanning regions overlaps a part of center portions of all the other scanning regions, and the end portion of each of the scanning regions does not overlap the end portion of all the other scanning regions, in a case where the predetermined region moves in the scanning direction from a first state in which the predetermined region is located in the center portion in all the scanning regions corresponding to the other some light emitting elements to a second state in which the predetermined region overlaps the end portion in at least one of the scanning regions corresponding to the other some light emitting elements and is located in the center portion in the scanning region corresponding to at least one of the light emitting elements among the some light emitting elements, the control unit may control the light source unit such that the light amount emitted to the predetermined region from the light emitting element corresponding to the scanning region in which the predetermined region overlaps the end portion in the other some light emitting elements returns to the light amount emitted to the predetermined region in a case where the determination unit does not determine that the target object satisfies the predetermined requirement, and the light amount emitted to the predetermined region in the second state becomes the light amount in the first state by changing the light amount emitted to the predetermined region from at least one of the light emitting elements corresponding to the scanning region in which the predetermined region is located in the center portion among some light emitting elements.

In the vehicle headlight, as described above, a light distribution pattern is formed by periodic scanning of light from the plurality of light emitting elements. In such a vehicle headlight, for example, when the predetermined region overlapping the target object is located in the vicinity of an end in the scanning direction of the scanning region through which the spot of light from the light emitting element passes, the distance between this end and the predetermined region may be narrower than the width of the spot in the scanning direction. By the way, the shortest length that allows light scanning is the width of the spot in the scanning direction. Therefore, in the case as described above, the light amount emitted to the predetermined region cannot be changed without changing the light amount emitted between the end and the predetermined region. Therefore, the light amount emitted between the above-described end and the predetermined region is also changed together with the predetermined region, and the region where the light amount is changed may suddenly become large, and the driver may feel a sense of discomfort. On the other hand, in this vehicle headlight, each scanning region corresponding to each light emitting element is divided into a pair of end portions and a center portion, and the width of the end portion is equal to or more than the width of the spot. Then, in the case of the second state in which the end portion of the scanning region corresponding to the light emitting element that emits the light in which the light amount of light emitted to the predetermined region is changed overlaps the predetermined region, the control unit controls the light source unit such that the light amount of light emitted from the light emitting element returns to the light amount emitted to the predetermined region in a case where the determination unit does not determine that the target object satisfies the predetermined requirement. Therefore, with the vehicle headlight, the distance between the predetermined region and the end of the scanning region corresponding to the light emitting element in which the light amount of light emitted to the predetermined region is changed can be prevented from being less than the width of the condensing spot in the scanning direction. In addition, in this case, the control unit controls the light source unit such that the light amount emitted to the predetermined region in the second state becomes the light amount in the first state by changing the light amount emitted to the predetermined region from the light emitting element in which the predetermined region is located in the center portion of the scanning region among the light emitting elements that emit light in which the light amount of light emitted to the predetermined region is not changed. Therefore, with the vehicle headlight, a change in the light amount emitted to the vicinity of the predetermined region can be suppressed, the brightness of the predetermined region can be prevented from changing, and the driver can be suppressed from feeling a sense of discomfort.

The predetermined region in the second state may be located in the center portion of the scanning region corresponding to two or more of the light emitting elements among some light emitting elements, and in the case of changing from the first state to the second state, the light amount emitted to the predetermined region from the light emitting element corresponding to the scanning region in which the distance between the center of the center portion in the scanning direction and the predetermined region is the shortest among the two or more of the light emitting elements among some light emitting elements may change.

In this vehicle headlight, the light amount of light emitted from the light emitting element corresponding to the scanning region in which the distance between the center of the center portion and the predetermined region is the shortest to the predetermined region changes. Therefore, even when the predetermined region further moves to one side or the other side in the scanning direction, the end portion of the scanning region corresponding to the light emitting element in which the light amount of light emitted to the predetermined region is changed in the case of changing from the first state to the second state and the predetermined region can be made less likely to overlap each other. Accordingly, with the vehicle headlight, it is possible to suppress an increase in the number of times the control unit controls the light source unit as described above.

In addition, the state that satisfies the predetermined requirement may be a state in which the distance between the target object and the vehicle is less than the predetermined distance.

In addition, the state that satisfies the predetermined requirement may be a state in which the apparent size of the target object is equal to or more than a predetermined value.

A vehicle headlight of the present invention includes: a plurality of light source units; a reflector configured to repeat a periodic motion to reflect light from the plurality of light source units and scan the light; and a control unit configured to control the plurality of light source units, in which the reflector reflects the light from the plurality of light source units such that a first light distribution pattern formed by scanning of light from some light source units among the plurality of light source units and a second light distribution pattern formed by scanning of light from other some light source units among the plurality of light source units partially overlap each other in an up-down direction of a vehicle, and in a case where a signal indicating that a retroreflective object located in front of the vehicle is detected is input from a detection device, the control unit controls the plurality of light source units such that the light amount of light emitted to a predetermined region overlapping the retroreflective object in one of the first light distribution pattern and the second light distribution pattern is reduced as compared with a case where a signal indicating that the retroreflective object is not detected is input from the detection device.

In a case where the retroreflective object reflects the light, the intensity of reflected light from the retroreflective object to the self-vehicle tends to increase as the intensity of light from the light source units to the retroreflective object increases. Here, a case where the signal indicating that the retroreflective object is detected is input to the control unit from the detection device is compared with the case where the signal indicating that the retroreflective object is not detected is not input to the control unit from the detection device. In a case where the signal indicating that the retroreflective object is detected is input to the control unit, as compared with the case where the signal indicating that the retroreflective object is not detected is not input to the control unit, the light amount of light emitted to the predetermined region overlapping the retroreflective object in one of the first light distribution pattern and the second light distribution pattern is reduced. The light is a part of the light forming one of the first light distribution pattern and the second light distribution pattern. When the light amount of light decreases, the intensity of light to the retroreflective object is suppressed, and the intensity of the reflected light can be suppressed, as compared with the case where the light amount does not decrease. Thus, even when the reflected light travels to the self-vehicle, impartment of glare to the driver of the self-vehicle can be suppressed. Accordingly, with the vehicle headlight, a reduction in driver's visibility can be suppressed.

In addition, a determination unit that determines whether the retroreflective object satisfies the predetermined requirement that the light amount of light reflected from the retroreflective object is equal to or more than the predetermined value in a case where the signal indicating the state of the retroreflective object is input from the detection device is further provided, the light source unit that emits light emitted to the predetermined region includes a plurality of light emitting elements, and the control unit may control the light source unit such that each of the light amount of the light from some light emitting elements among the plurality of light emitting elements and the light amount of the light from other some light emitting elements among the plurality of light emitting elements is reduced in a case where the determination unit determines that the retroreflective object satisfies the predetermined requirement as compared with the case where the determination unit determines that the retroreflective object does not satisfy the predetermined requirement.

With the vehicle headlight, in the state in which the retroreflective object satisfies the predetermined requirement, the irradiation of the retroreflective object with light is suppressed, and the intensity of the reflected light can be further suppressed as compared with the state in which the retroreflective object does not satisfy the predetermined requirement. Accordingly, with the vehicle headlight, a reduction in driver's visibility can be further suppressed.

In addition, a determination unit that determines whether the retroreflective object satisfies the predetermined requirement that the light amount of light reflected from the retroreflective object is equal to or more than the predetermined value in a case where the signal indicating the state of the retroreflective object is input from the detection device is further provided, the light source unit that emits light emitted to the predetermined region includes a plurality of light emitting elements, and the control unit may control the light source unit such that the light amount of the light from some light emitting elements among the plurality of light emitting elements is reduced and the light amount of the light from other some light emitting elements among the plurality of light emitting elements becomes the same in a case where the determination unit determines that the retroreflective object satisfies the predetermined requirement as compared with the case where the determination unit determines that the retroreflective object does not satisfy the predetermined requirement.

In a case where the retroreflective object satisfies the predetermined requirement and a case where the retroreflective object does not satisfy the predetermined requirement, when the light amount of light from other some light emitting element is the same, the control unit can perform the same control on the other some light emitting element in both cases. For example, even when the state is switched from the case where the retroreflective object does not satisfy the predetermined requirement to the case where the retroreflective object satisfies the predetermined requirement, the control unit may not need to change the amount of power supplied to the other some light emitting elements. Accordingly, the control unit can easily control other some light emitting elements as compared with the case where the light amount of light from other some light emitting elements changes in a case where the retroreflective object satisfies the predetermined requirement and a case where the retroreflective object does not satisfy the predetermined requirement.

In addition, the state that satisfies the predetermined requirement may be a state in which the distance between the retroreflective object and the vehicle is less than the predetermined distance.

In addition, the state that satisfies the predetermined requirement may be a state in which the apparent size of the retroreflective object is equal to or more than a predetermined value.

DESCRIPTION OF EMBODIMENTS

Preferred embodiments of a vehicle headlight according to the present invention will be described below in detail with reference to the drawings. The embodiments illustrated below are for facilitating the understanding of the present invention, and are not for limiting the interpretation of the present invention. The present invention can be changed or modified without departing from the spirit. In addition, in the present invention, components in the following exemplary embodiments may be appropriately combined. Note that, for easy understanding, some parts may be exaggerated in each drawing.

First Embodiment

Figure 1:
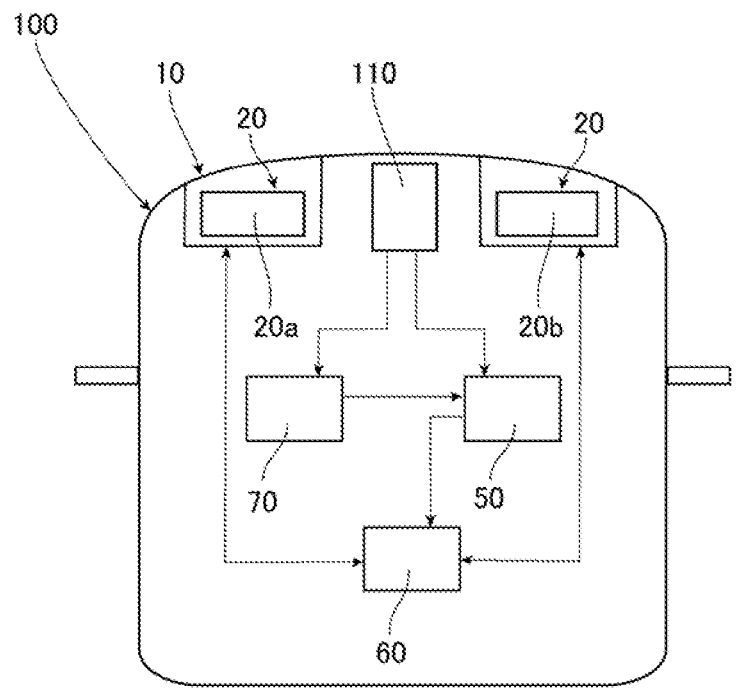
FIG. 1 is a plan diagram conceptually illustrating a vehicle.

A first embodiment as a first aspect of the present invention will be described. FIG. 1 is a plan diagram conceptually illustrating a vehicle 100. As illustrated in FIG. 1, the vehicle 100 includes a vehicle headlight 10 and a detection device 110.

The vehicle headlight 10 of the present embodiment is a headlight for an automobile. The vehicle headlight 10 mainly includes a pair of lighting tools 20 arranged on the left and right of a front portion of the vehicle 100, a determination unit 50, a control unit 60, and a recording unit 70. Note that, in the present specification, "right" means the right side in the traveling direction of the vehicle 100, and "left" means the left side in the traveling direction of the vehicle 100.

The pair of lighting tools 20 has a substantially symmetrical shape in the left-right direction of the vehicle 100. The pair of lighting tools 20 of the present embodiment emits a low beam or a high beam to the front of the vehicle 100. The configuration of one lighting tool 20a of the pair of lighting tools 20 is the same as the configuration of the other lighting tool 20b of the pair of lighting tools 20 except that the shape is substantially symmetrical. Therefore, the configuration of each of the lighting tools 20a and 20b will be described below using the lighting tool 20a.

Figure 2:
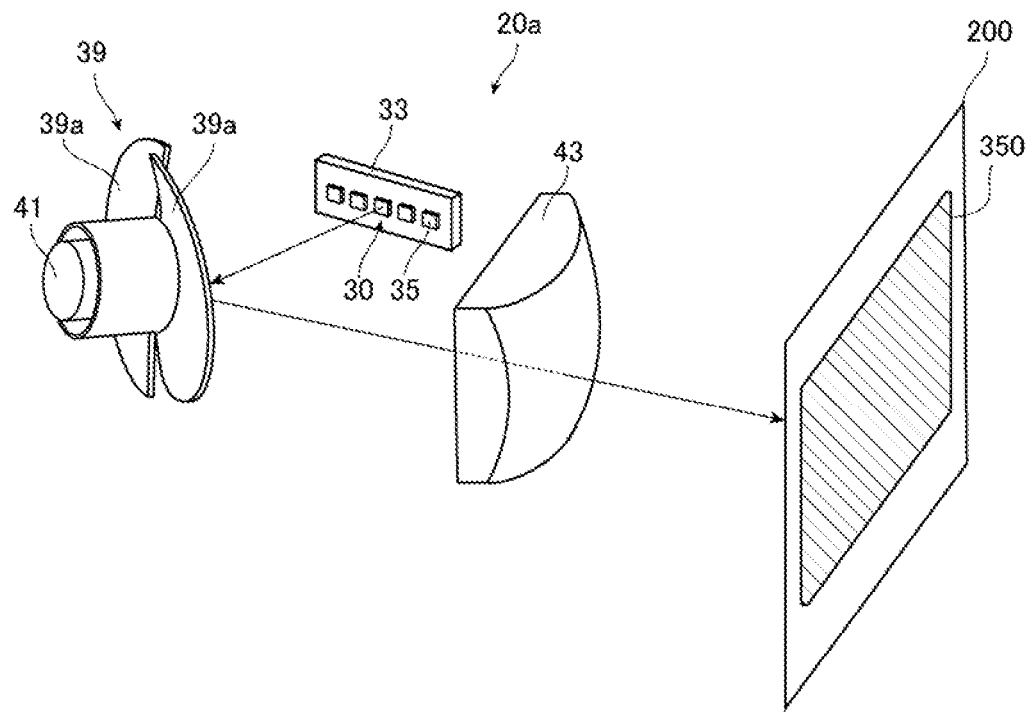
FIG. 2 is a diagram schematically illustrating one lighting tool of a first embodiment.

FIG. 2 is a diagram schematically illustrating the lighting tool 20a of the first embodiment illustrated in FIG. 1. As illustrated in FIG. 2, the lighting tool 20a includes, as main configurations, a light source unit 30, a reflector 39, a drive unit 41, and a projection lens 43.

The light source unit 30 includes a plurality of light emitting elements 35 mounted on a circuit board 33. The plurality of light emitting elements 35 is arranged in a row along a predetermined direction. As the light emitting element 35, for example, a light emitting diode (LED) or the like is used. FIG. 2 illustrates the light source unit 30 including five light emitting elements 35. Note that the number of the light emitting elements 35 in the light source unit 30 is not particularly limited as long as it is two or more.

Power is supplied to each light emitting element 35 via the circuit board 33. The light amount of light emitted from each light emitting element 35 is adjusted by adjusting the power supplied to each light emitting element 35. The light is emitted toward the reflector 39.

Examples of the reflector 39 of the present embodiment include a rotary reflector. The reflector 39 is fixed to an output shaft, which is not illustrated, of the drive unit 41, and rotates about a rotation axis, which is not illustrated, of the drive unit 41 passing through the center of the output shaft by a rotational force from the drive unit 41. The reflector 39 rotates to repeat a periodic motion. Examples of the drive unit 41 include a motor having an encoder, which is not illustrated, that detects the rotational position of the output shaft from the reference position. The encoder outputs a signal indicating rotational position information such as the detected rotational position of the output shaft to the control unit 60. Note that the lighting tool 20a may include a sensor that detects rotational position information such as the rotational position of the reflector 39 from the reference position instead of the encoder. In this case, the sensor outputs a signal indicating the rotational position information to the control unit 60. The reflector 39 includes two reflection blades 39a that reflect the light from the light source unit 30 toward the projection lens 43.

The projection lens 43 of the present embodiment is an aspherical plano-convex lens. In the projection lens 43, an incident surface which is a surface on a side on which the light reflected by the reflection blades 39a of the reflector 39 is incident is formed in a planar shape, and an emission surface which is a surface on a side from which the incident light is emitted is formed in a convex shape bulging in an emission direction.

In the present embodiment, the plurality of light emitting elements 35 of the light source unit 30 emits light toward the reflector 39, and the reflector 39 rotates. Thus, the reflector 39 repeats the rotational motion that is a periodic motion to reflect the light from the plurality of light emitting elements 35 toward the projection lens 43 side, and scans the light in the left-right direction of the vehicle 100. When this light passes through the projection lens 43, is emitted to the front of the vehicle 100, and scanned in the left-right direction of the vehicle 100, a predetermined light distribution pattern 350 is formed on a vertical plane 200 in front of the vehicle 100. Accordingly, the reflector 39 repeats the periodic motion to reflect the light from the plurality of light emitting elements 35 and periodically scan the light to form the predetermined light distribution pattern 350. The predetermined light distribution pattern 350 illustrated in FIG. 2 indicates a light distribution pattern of a high beam having a rectangular shape horizontally long in the left-right direction of the vehicle 100. In the present embodiment, the shape of the reflecting surface of the reflection blades 39a that reflect the light from the plurality of light emitting elements 35, the positions of the plurality of light emitting elements 35 with respect to the reflection blades 39a, and the like are adjusted so as to form the predetermined light distribution pattern 350. Although details will be described below, the predetermined light distribution pattern 350 to be formed can be changed by controlling the emission of light from the plurality of light emitting elements 35.

Here, referring back to FIG. 1, the description of the vehicle will be continued.

The control unit 60 determines whether a control signal from a light switch, which is not illustrated, mounted on the vehicle 100 is input. The control signal is a signal instructing start of emission of light from the light source unit 30 of each of the lighting tool 20a and the lighting tool 20b. In a case where the control signal is input to the control unit 60, the control unit 60 drives the light source unit 30 and drives the drive unit 41. In a case where the control signal is not input to the control unit 60, the control unit 60 stops the driving of the light source unit 30 and stops the driving of the drive unit 41.

The control unit 60 can use, for example, an integrated circuit such as a microcontroller, an integrated circuit (IC), a large-scale integrated circuit (LSI), or an application specific integrated circuit (ASIC), or a numerical control (NC) device. In addition, when the NC device is used, the control unit 60 may use a machine learning device or may not use a machine learning device.

The detection device 110 detects a target object located in front of the vehicle 100. Examples of the target object detected by the detection device 110 include a retroreflective object and an object other than the retroreflective object. The retroreflective object of the present embodiment is an object that does not emit light by itself and retroreflects light emitted to the retroreflective object at a predetermined spreading angle. Examples of such a retroreflective object include a road sign installed in the vicinity of the road. In addition, examples of the object other than the retroreflective object include a vehicle such as a preceding vehicle or an oncoming vehicle, and a human such as a pedestrian.

As a configuration of the detection device 110, the detection device 110 mainly includes, for example, a camera, an image processing unit, a detection unit, and the like, which are not illustrated. The camera is attached to the front portion of the vehicle 100 and captures an image of the front of the vehicle 100. The captured image captured by the camera includes at least a part of a region irradiated with light emitted from the pair of lighting tools 20. The image processing unit performs image processing on a captured image captured by the camera. When detecting the target object, the detection unit outputs a signal indicating that the target object is detected to the control unit 60 via the determination unit 50. Note that the detection unit may directly output the signal to the control unit 60. In addition, the detection unit detects the state of the target object from the information subjected to the image processing by the image processing unit. Examples of the state of the target object include the presence of the target object, the presence position of the target object in the captured image, the type of the target object, and the ratio of the target object in the captured image. When detecting a target object located in front of the vehicle 100, the detection device 110 outputs a signal indicating the state of the target object to the determination unit 50 and outputs the captured image to the recording unit 70. The detection device 110 identifies and detects a retroreflective object and a human as target objects as described below. In addition, when no target object is present in front of the vehicle 100 and the target object is not detected, the detection device 110 outputs a signal indicating that the target object is not detected to the determination unit 50 and outputs the captured image to the recording unit 70. The signal is also a signal indicating that the target object is not present. Note that the detection device 110 may not output the signal in a case where the target object is not detected. In addition, the target object detected by the detection device 110, the number of types of target objects, and the configuration of the detection device 110 are not particularly limited. Examples of the configuration of the image processing unit and the configuration of the detection unit include the same configuration as the control unit 60. In addition, the control unit 60 and at least one of the image processing unit and the detection unit of the detection device 110 may be integrally configured, and the control unit 60 may also serve as at least one of the image processing unit and the detection unit.

Next, an example of detection of the presence of a retroreflective object from the captured image will be described. Note that the retroreflective object will be described as a road sign. The recording unit 70 records image data of each road sign in advance. When the target object shown in the captured image corresponds to the image data of the road sign recorded in the recording unit 70, the detection unit detects the target object as a retroreflective object. As another example of detection, generally, the shape of a road sign is a circle, a rectangle, or a triangle, and the road sign has a combination of colors such as red, white, blue, yellow, black, and green. The detection unit may detect the target object as the retroreflective object as long as the outer shape of the target object shown in the captured image captured by the camera is any of a circle, a rectangle, and a triangle, and the color inside the outer shape of the target object is a combination of the above colors. The above two examples of detection may be combined. In addition, when the retroreflective object is a delineator, the light reflected from the delineator is, for example, orange. When the light from the target object shown in the captured image captured by the camera is orange, the detection unit may detect the target object as a retroreflective object. Note that the detection of the retroreflective object by the detection unit is not limited to the above.

Next, an example of detection of the presence of a human from the captured image will be described. The detection unit detects a target object as a human when authenticating the face of the human shown in the captured image. Alternatively, the detection unit may include a human sensor that detects infrared rays near body temperature emitted from a human. In a case where the human sensor detects infrared rays and infrared rays are shown in the captured image, the detection unit may detect a target object that is shown in the captured image and emits infrared rays as a human. Note that the detection of the human by the detection unit is not limited to the above.

On the basis of a signal indicating the state of the target object from the detection device 110 that detects the target object located in front of the vehicle 100, the determination unit 50 determines whether the target object satisfies a predetermined requirement that the light amount of the reflected light from the target object to the self-vehicle is equal to or more than a predetermined value. The state that the predetermined requirement is satisfied indicates, for example, a state in which the distance between the target object and the vehicle 100 is less than the predetermined distance. The predetermined distance is, for example, 30 m. The numerical value of the distance is recorded in the recording unit 70 as a threshold value, and may be appropriately changeable according to the traveling status of the vehicle 100 such as daytime and nighttime, the type of target object, and the like. In addition, the numerical value of the distance may be set for each type of the target object. For example, the determination unit 50 mainly includes a calculation unit and a determination main unit. The calculation unit calculates the distance between the target object and the vehicle 100 on the basis of the above ratio in the state of the target object from the detection device 110. A signal indicating the calculated distance is output to the determination main unit. The determination main unit reads a predetermined distance, which is a threshold value, from the recording unit 70, compares the calculated distance with the predetermined distance, and determines whether the calculated distance is larger than the predetermined distance. When the calculated distance is equal to or more than the predetermined distance, the determination main unit determines that the target object does not satisfy the predetermined requirement. In addition, when the calculated distance is less than the predetermined distance, the determination main unit determines that the target object satisfies the predetermined requirement. Then, when the determination main unit determines that the target object satisfies the predetermined requirement, the determination unit 50 outputs a signal indicating the state of the target object such as the distance calculated by the calculation unit, the presence position of the target object in the captured image, and the type of the target object to the control unit 60. Examples of the configuration of the determination unit 50 include the same configuration as the control unit 60. Note that the control unit 60 and the determination unit 50 may be integrally configured, and the control unit 60 may also serve as the determination unit 50.

The recording unit 70 records the captured image output from the detection device 110 and the predetermined distance, which is the threshold value described above, in the determination unit 50. Examples of the recording unit 70 include a semiconductor memory such as ROM and a magnetic disk.

Figure 3:
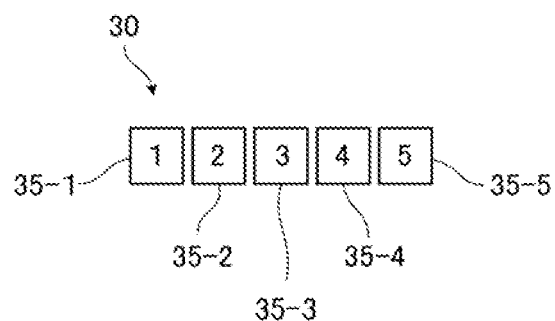
FIG. 3 is a diagram illustrating a layout of light emitting elements of a light source unit of the first embodiment.
Figure 4:
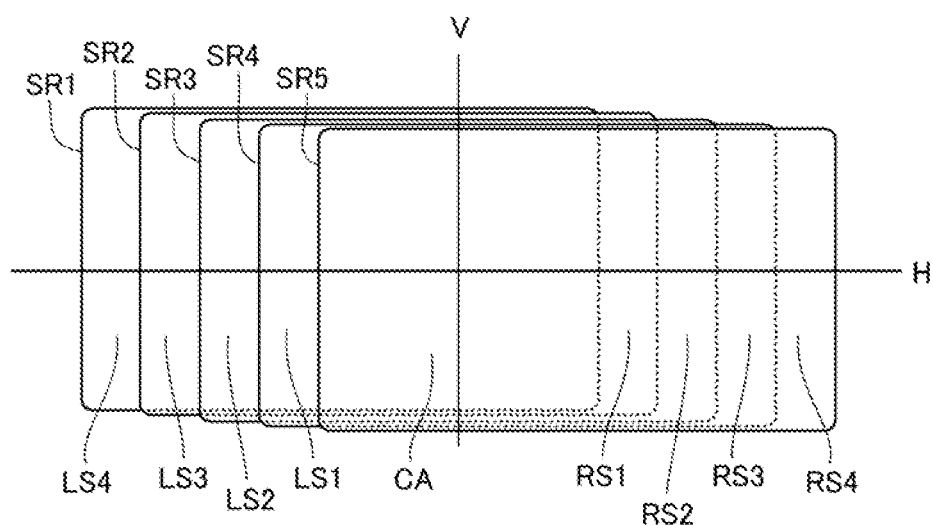
FIG. 4 is a diagram illustrating a scanning region through which a condensing spot of light from each light emitting element of the first embodiment passes.

FIGS. 3 and 4 are diagrams describing formation of the predetermined light distribution pattern 350.

FIG. 3 is a diagram illustrating a layout of light emitting elements 35-1 to 35-5 of the light source unit 30 of the present embodiment. As described above, the light source unit 30 includes the five light emitting elements 35-1 to 35-5.

FIG. 4 is a diagram illustrating scanning regions SR1 to SR5 through which condensing spots of light pass when the light from the light emitting elements 35-1 to 35-5 are scanned by the reflector 39 to form the predetermined light distribution pattern 350. The condensing spot is a spot formed by the light from each of the light emitting elements 35-1 to 35-5, and is a spot projected in front of the vehicle 100. In FIG. 4, H represents a horizontal line along the left-right direction of the vehicle 100, and V represents a vertical line along the up-down direction of the vehicle 100. A scanning region SR1 of the present embodiment indicates a region through which a condensing spot formed by light from an i-th ($1 \leq i \leq 5$) light emitting element 35-$i$ passes. The scanning regions SR1 to SR5 have a rectangular shape horizontally long in the left-right direction of the vehicle 100 and have substantially the same size. The positions of the scanning regions SR1 to SR5 in the up-down direction are substantially the same, and the positions in the left-right direction are different. Accordingly, the scanning regions SR1 to SR5 are arranged to be displaced from each other in the left-right direction such that a part of each of the scanning regions SR1 to SR5 overlaps a part of another scanning region. Note that, in FIG. 4, the scanning regions SR1 to SR5 are illustrated to be displaced in the up-down direction for easy understanding. The outer shape of the set of scanning regions SR1 to SR5 corresponds to the outer shape of the predetermined light distribution pattern 350 illustrated in FIG. 2.

In the scanning regions SR1 to SR5, the scanning region SR1 is located on the leftmost side, and the scanning regions SR1 to SR5 are arranged to be gradually displaced to the right in the order of the scanning regions SR1 to SR5. Accordingly, the center of the scanning region SR2 in the left-right direction is located on the right side of the center of the scanning region SR1 in the left-right direction, and a part of the scanning region SR2 and a part of the scanning region SR1 overlap each other. In addition, the center of the scanning region SR3 in the left-right direction is located on the right side of the center of the scanning region SR2 in the left-right direction, and a part of the scanning region SR3 and a part of the scanning regions SR1 to SR2 overlap each other. The center of the scanning region SR4 in the left-right direction is located on the right side of the center of the scanning region SR3 in the left-right direction, and a part of the scanning region SR4 and a part of the scanning regions SR1 to SR3 overlap each other. The center of the scanning region SR5 in the left-right direction is located on the right side of the center of the scanning region SR4 in the left-right direction, and a part of the scanning region SR5 and a part of the scanning regions SR1 to SR4 overlap each other.

A center region CA is located at a center portion of the set of the set scanning regions SR1 to SR5 in the left-right direction. In the center region CA, parts of the five scanning regions SR1 to SR5 overlap each other, and the center region CA can be irradiated with light from the five light emitting elements 35-1 to 35-5. In a first left region LS1 located on the left side of the center region CA, parts of the four scanning regions SR1 to SR4 overlap each other, and in a first right region RS1 located on the right side of the center region CA, parts of the four scanning regions SR2 to SR5 overlap each other. In a second left region LS2 located on the left side of the first left region LS1, parts of the three scanning regions SR1 to SR3 overlap each other, and in a second right region RS2 located on the right side of the first right region RS1, parts of the three scanning regions SR3 to SR5 overlap each other. In a third left region LS3 located on the left side of the second left region LS2, parts of the two scanning regions SR1 and SR2 overlap each other, and in a third right region RS3 located on the right side of the second right region RS2, parts of the two scanning regions SR4 and SR5 overlap each other. A fourth left region LS4 located on the left side of the third left region LS3 includes a part of the scanning region SR1, and a fourth right region RS4 located on the right side of the third right region RS3 includes a part of the scanning region SR5. Therefore, the first left region LS1 and the first right region RS1 can be irradiated with the light from the four light emitting elements, and the second left region LS2 and the second right region RS2 can be irradiated with the light from the three light emitting elements. In addition, the third left region LS3 and the third right region RS3 can be irradiated with the light from the two light emitting elements, and the fourth left region LS4 and the fourth right region RS4 can be irradiated with the light from the one light emitting element.

Figure 5:
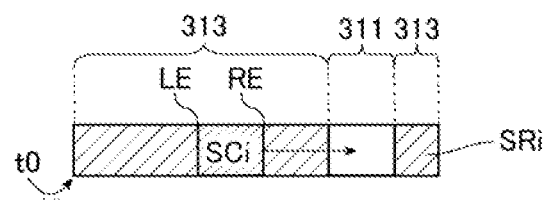
FIG. 5 is a diagram illustrating a scanning region of the first embodiment.
Figure 6:
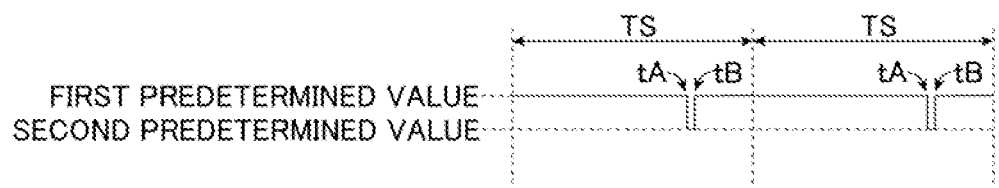
FIG. 6 is a time chart illustrating a turn-on/turn-off state of the light emitting element of the first embodiment.

FIGS. 5 and 6 are diagrams describing control of the light emitting element 35-$i$ in the scanning region SR1. FIG. 5 is a diagram illustrating the scanning region SR1. In the scanning region SR1 illustrated in FIG. 5, a non-hatched range indicates a light amount change region 311, and a hatched range indicates a light amount non-change region 313. The light amount non-change region 313 is a region where the light amount of light from the light emitting element 35-$i$ is substantially a predetermined amount. On the other hand, the light amount change region 311 is a region in which the light amount of light from the light emitting element 35-$i$ is different from the light amount of light emitted to the light amount non-change region 313. FIG. 6 is a time chart illustrating the light amount of light emitted from the light emitting element 35-$i$. TS illustrated in FIG. 6 indicates a scanning period.

SCi illustrated in FIG. 5 indicates a position of a condensing spot of light from the light emitting element 35-$i$ at a certain time. It is assumed that the condensing spot SCi is scanned from the left to the right in the drawing. It is assumed that a left end LE of the condensing spot SCi is located at the left end of the scanning region SR1 at a certain time t0. The control unit 60 grasps the position of the condensing spot SCi in the scanning region SR1 on the basis of the rotational position information from the drive unit 41, and controls the luminance of the light emitting element 35-$i$ in synchronization with the rotational position information. Note that, in FIG. 5, the size of the condensing spot SCi with respect to the scanning region SR1 is larger than the actual size for easy understanding.

In the light amount non-change region 313, the control unit 60 controls the luminance of the light emitting element 35-$i$ such that the light amount of light emitted from the light emitting element 35-*i* corresponding to the condensing spot SCi becomes a first predetermined value during a period in which the condensing spot SCi passes through the light amount non-change region 313. The first predetermined value indicates a value of the light amount of light emitted from the light emitting element 35-*i* in the light amount non-change region 313. In addition, the first predetermined value is, for example, 80% or the like of the maximum value of the light amount of light emitted from the light emitting element 35-*i*.

In addition, in the light amount change region 311, the control unit 60 controls the luminance of the light emitting element 35-*i* such that the light amount of light emitted from the light emitting element 35-*i* corresponding to the condensing spot SCi becomes a second predetermined value during a period in which the condensing spot SCi passes through the light amount change region 311. Specifically, as illustrated in FIGS. 5 and 6, the control unit 60 controls the light amount of light emitted from the light emitting element 35-*i* to the second predetermined value at timing to at which a right end RE of the condensing spot SCi reaches the light amount change region 311. In addition, the control unit 60 controls the light amount of light emitted from the light emitting element 35-*i* to the first predetermined value at timing tB at which the left end LE of the condensing spot SCi reaches the right end of the light amount change region 311. The second predetermined value indicates a value of the light amount of light emitted from the light emitting element 35-*i* in the light amount change region 311. The second predetermined value is a value different from the first predetermined value. FIG. 6 illustrates an example in which the second predetermined value is lower than the first predetermined value. In a case where the second predetermined value is lower than the first predetermined value, the second predetermined value is, for example, 30% or zero or the like of the maximum value of the light amount of light emitted from the light emitting element 35-*i*. In addition, the second predetermined value may be made higher than the first predetermined value, and in this case, the second predetermined value is, for example, a maximum value of the light amount of light emitted from the light emitting element 35-*i*. When the second predetermined value is zero, the light from the light emitting element 35-*i* is turned off.

Figure 7:
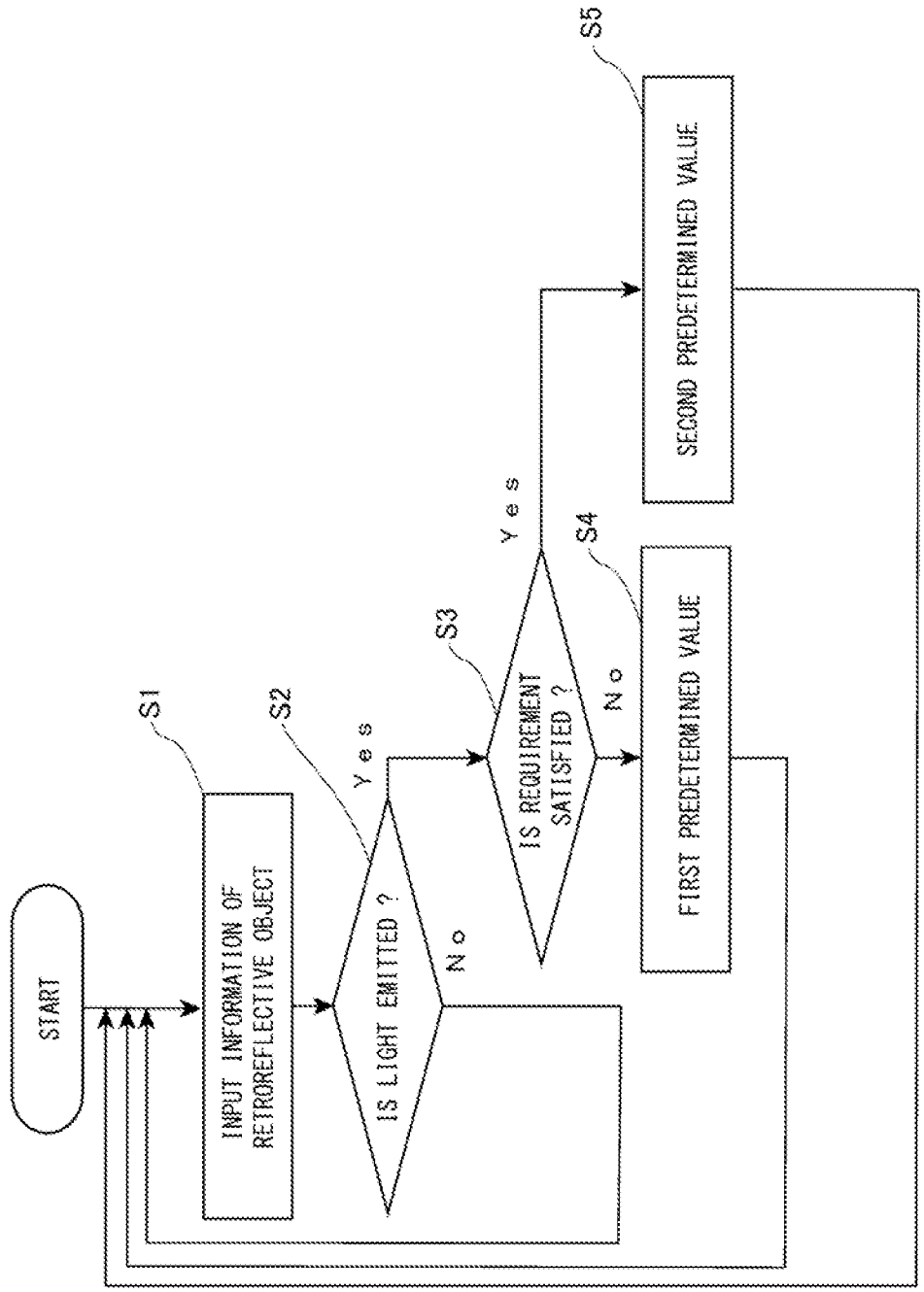
FIG. 7 is a flowchart illustrating an operation of a vehicle headlight.

FIG. 7 is a flowchart illustrating an operation of the vehicle headlight 10 in the present embodiment. As illustrated in FIG. 7, the flowchart of the present embodiment includes Steps S1 to S5.

(Step S1)

The detection device 110 captures an image of the front of the vehicle 100 with a camera. When detecting a target object located in front of the vehicle 100 from the captured image, the detection device 110 outputs a signal indicating that the target object is detected to the control unit 60 via the determination unit 50, and outputs a signal indicating the state of the target object to the determination unit 50. In addition, when not detecting a target object located in front of the vehicle 100 from the captured image, the detection device 110 outputs a signal indicating that the target object is not detected to the determination unit 50. In the present embodiment, the detection device 110 identifies and detects a retroreflective object and a human as target objects. When the signal is input, the processing proceeds to Step S2.

(Step S2)

In the present step, the control unit 60 determines whether to emit the light on the basis of the control signal from the light switch. In a case where the control signal is not input to the control unit 60, the control unit 60 stops the driving of the plurality of light source units 30 and stops the driving of the drive unit 41, and the light is not emitted, and the processing returns to Step S1. In addition, in a case where the control signal is input to the control unit 60, the light is emitted, and the processing proceeds to Step S3.

(Step S3)

In the present step, the determination unit 50 determines whether the target object satisfies a predetermined requirement on the basis of the signal indicating the state of the target object from the detection device 110. In a case where the determination unit 50 determines that the target object does not satisfy the predetermined requirement, the processing proceeds to Step S4. In addition, in a case where the signal indicating that the target object is not detected is input to the determination unit 50, it is determined that the target object does not satisfy the predetermined requirement, and the processing proceeds to Step S4. On the other hand, in a case where the determination unit 50 determines that the target object satisfies the predetermined requirement, the determination unit 50 outputs a signal indicating the state of the target object such as the distance between the target object and the vehicle 100 calculated by the calculation unit, the presence position of the target object in the captured image, and the type of the target object to the control unit 60. When the determination unit 50 outputs the signal, the processing proceeds to Step S5. Hereinafter, the state that the predetermined requirement is satisfied will be described as an example in which the distance between the target object and the vehicle 100 is less than a predetermined distance. In addition, in the following description, it is assumed that the target object is located diagonally forward left of the vehicle 100.

(Step S4)

Figure 8:
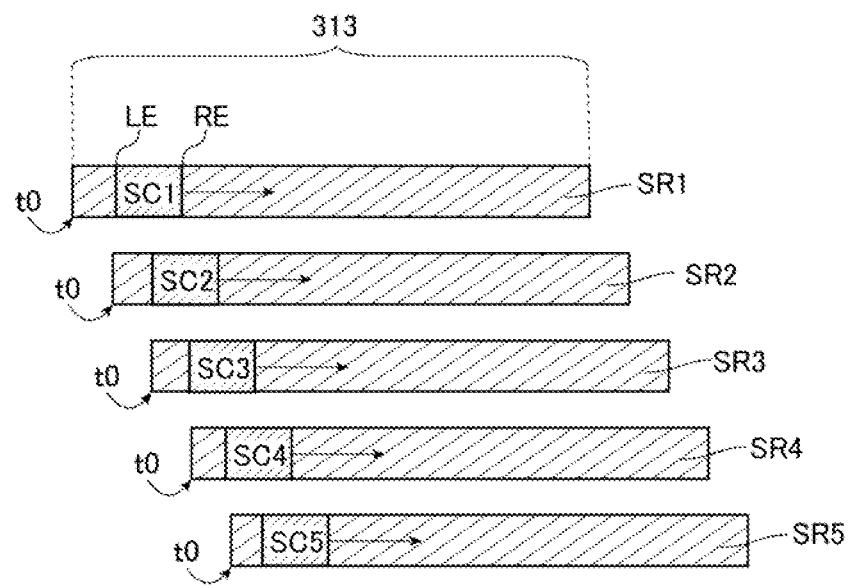
FIG. 8 is a diagram describing scanning of a condensing spot in Step S4.
Figure 9:
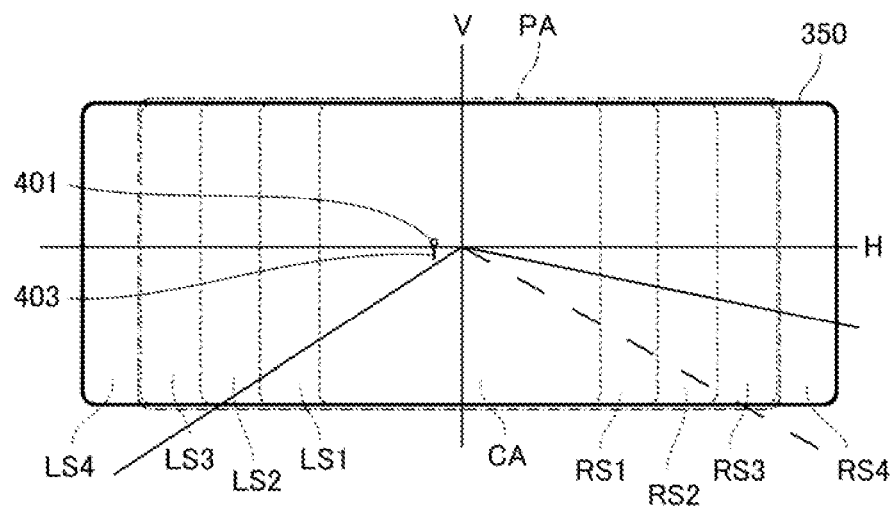
FIG. 9 is a diagram illustrating a predetermined light distribution pattern in Step S4.

In the present step, as described in Step S3, the retroreflective object as the target object is detected by the detection device 110, and the distance between the retroreflective object and the vehicle 100 is equal to or more than the predetermined distance, or the target object is not detected by the detection device 110. In this case, the control unit 60 controls the driving of the light source unit 30 and also controls the driving of the drive unit 41. FIG. 8 is a diagram describing scanning of condensing spots SC1 to SC5 in the present step. FIG. 9 is a diagram illustrating a predetermined light distribution pattern 350 formed when the distance between the retroreflective object 401 as a target object and the vehicle 100 is equal to or more than a predetermined distance. Note that the predetermined light distribution pattern 350 illustrated in FIG. 9 is the same as the predetermined light distribution pattern 350 illustrated in FIG. 2.

Here, first, scanning of the condensing spots SC1 to SC5 in the present step will be described with reference to FIG. 8. In FIG. 8, the plurality of scanning regions SR1 to SR5 is displaced and arranged for easy viewing. The condensing spots SC1 to SC5 scan the scanning regions SR1 to SR5 from the left to the right in the drawing. When the distance between the target object and the vehicle 100 is equal to or more than the predetermined distance and when the target object is not detected by the detection device 110, the control unit 60 sets each of the scanning regions SR1 to SR5 as the light amount non-change region 313. Next, the control unit 60 controls the light emitting elements 35-1 to 35-5 such that the light amount of light emitted from the light emitting elements 35-1 to 35-5 corresponding to the condensing spots SC1 to SC5 becomes the first predetermined value.

When the light emitting elements 35-1 to 35-5 controlled as described above emit light, the light is reflected toward the projection lens 43 by the reflector 39 rotated by the drive unit 41. In addition, the light passes through the projection lens 43, is emitted to the front of the vehicle 100, and scans in the left-right direction of the vehicle 100. By this light scanning, the predetermined light distribution pattern 350 is formed in front of the vehicle 100 as illustrated in FIG. 9. As illustrated in FIG. 9, when the retroreflective object 401 is a road sign installed in the vicinity of the road, the retroreflective object 401 is supported by, for example, a support portion 403 that is a metal pillar erected from the vicinity of the road. In FIG. 9, H indicates a horizontal line, the predetermined light distribution pattern 350 is indicated by the thick line, and the predetermined light distribution pattern 350 is a light distribution pattern formed on a vertical plane, for example, 25 m away from the vehicle 100. In addition, in FIG. 9, the left and right edges of each of the scanning regions SR1 to SR5 are indicated by the dotted lines.

As described above, the center region CA is a region where parts of the scanning regions SR1 to SR5 overlap each other. Therefore, the light from the five light emitting elements 35-1 to 35-5 is superimposed on each other in a region of the predetermined light distribution pattern 350 illustrated in FIG. 9 overlapping the center region CA. Note that this superimposition of light also includes superimposition of light in human vision. In addition, the light from the four light emitting elements is superimposed on each other in a region of the predetermined light distribution pattern 350 overlapping the first left region LS1 and the first right region RS1, and the light from the three light emitting elements is superimposed on each other in a region of the predetermined light distribution pattern 350 overlapping the second left region LS2 and the second right region RS2. In addition, the light from the two light emitting elements is superimposed on each other in a region of the predetermined light distribution pattern 350 overlapping the third left region LS3 and the third right region RS3, and the light from the one light emitting element forms a region of the predetermined light distribution pattern 350 overlapping the fourth left region LS4 and the fourth right region RS4. As described above, each of the scanning regions SR1 to SR5 is set as the light amount non-change region 313. In this case, in a region of the predetermined light distribution pattern 350 where the number of scanning regions overlapping each other is large, the intensity of light in the predetermined light distribution pattern 350 increases. Therefore, in the light distribution pattern 350, the intensity of light in a region of the light distribution pattern 350 overlapping the center region CA is the strongest, and the intensity of light is weaker toward the outer side of the light distribution pattern 350 in the left-right direction. In addition, a superimposition region PA that coincides with a region of the predetermined light distribution pattern 350 including the regions CA, LS1 to LS3, and RS1 to RS3 is a region where the light from at least two light emitting elements is superimposed on each other, and the predetermined light distribution pattern 350 includes such superimposition region PA. Note that, in FIG. 9, the superimposition region PA is indicated by the alternate long and short dash line.

(Step S5)

Figure 10:
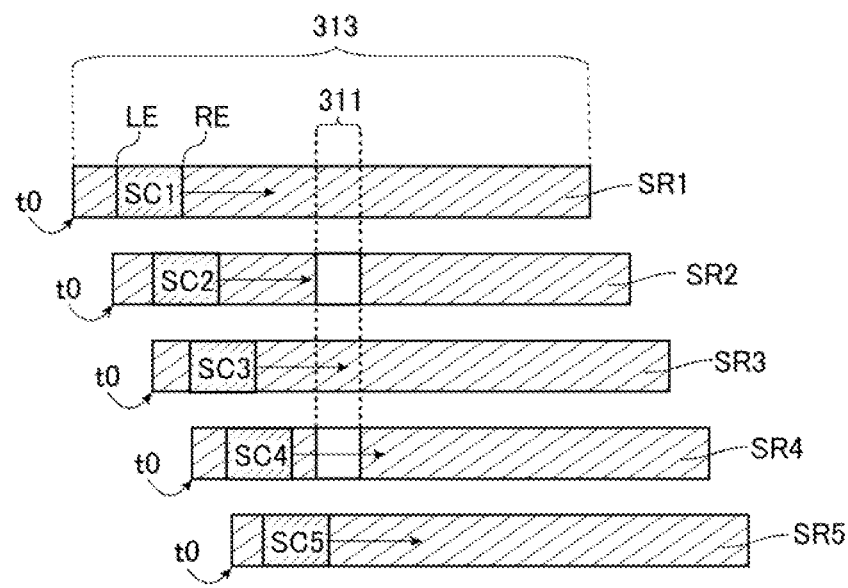
FIG. 10 is a diagram describing scanning of a condensing spot in Step S5.
Figure 11:
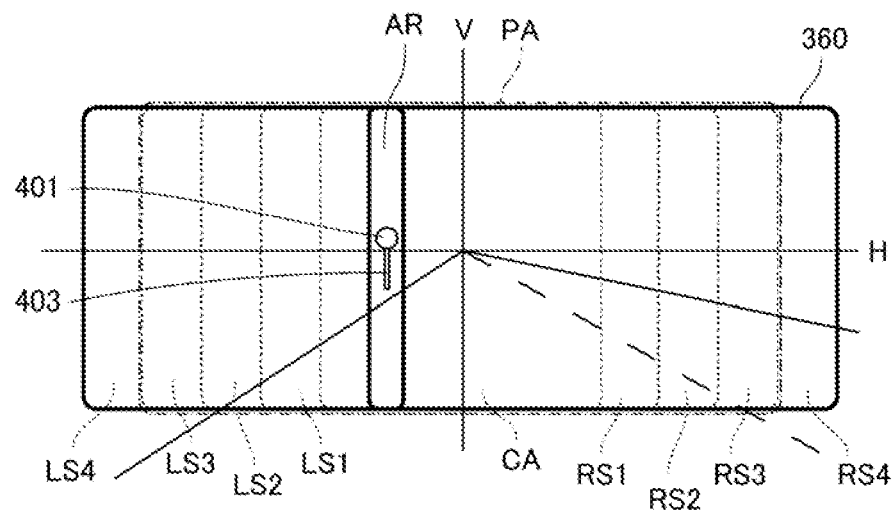
FIG. 11 is a diagram illustrating a specific light distribution pattern in Step S5.

In the present step, the retroreflective object as the target object is detected by the detection device 110, and the distance between the retroreflective object and the vehicle 100 is less than the predetermined distance. In this case, the control unit 60 controls the driving of the light source unit 30 and also controls the driving of the drive unit 41. FIG. 10 is a diagram describing scanning of the condensing spots SC1 to SC5 in the present step. FIG. 11 is a diagram illustrating a specific light distribution pattern 360 formed when the distance between the retroreflective object 401 and the vehicle 100 is less than the predetermined distance. In addition, in FIG. 11, the left and right edges of each of the scanning regions SR1 to SR5 are indicated by the dotted lines. Here, the description will be given assuming that the retroreflective object overlaps the superimposition region PA.

In the present step, the control unit 60 sets a region where the retroreflective object overlaps the superimposition region PA as a predetermined region AR on the basis of the signal from the determination unit 50. As illustrated in FIG. 11, the predetermined region AR is a region extending linearly from the upper end to the lower end of the superimposition region PA, and is located in the center region CA. Therefore, in a case where the predetermined region AR is formed in the light distribution pattern 350 illustrated in FIG. 9, the light from the five light emitting elements 35-1 to 35-5 is superimposed on each other in the predetermined region AR. The position of the predetermined region AR in the left-right direction changes according to the position of the retroreflective object 401 in the left-right direction with respect to the vehicle 100, and in the present embodiment, the center of the predetermined region AR in the left-right direction substantially coincides with the center of the retroreflective object 401 in the left-right direction. Note that the center of the predetermined region AR in the left-right direction may not coincide with the center of the retroreflective object 401 in the left-right direction. In addition, the width of the predetermined region AR in the left-right direction changes according to the distance between the vehicle 100 and the retroreflective object 401. In the present embodiment, the entire retroreflective object 401 overlaps the predetermined region AR, and the width of the predetermined region AR in the left-right direction is made wider as the distance from the retroreflective object 401 is shorter. Note that the width of the predetermined region AR in the left-right direction may not change according to the distance between the vehicle 100 and the retroreflective object 401. The width of the predetermined region AR in the left-right direction is narrower than the width of the center region CA, but may be the same as that of the center region CA.

Next, as illustrated in FIG. 10, in a case where the light distribution pattern 350 illustrated in FIG. 9 is formed, the control unit 60 does not set the light amount change region 311 in some scanning regions of the scanning regions SR1 to SR5 in the light emitting elements 35-1 to 35-5 that emit light to the predetermined region AR, which is not illustrated in FIG. 9, and sets the light amount change region 311 in other some scanning regions. In the present embodiment, FIG. 10 illustrates a state in which the light amount change region 311 is not set in the three scanning regions SR1, SR3, and SR5, and the light amount change region 311 is set in the two scanning regions SR2 and SR4. Note that in FIG. 10, similarly to FIG. 8, the plurality of scanning regions SR1 to SR5 is displaced and arranged for easy viewing. The light amount change region 311 corresponds to the predetermined region AR, the position of the light amount change region 311 in the left-right direction is the same as that of the predetermined region AR, and the width of the light amount change region 311 in the left-right direction is the same as that of the predetermined region AR. In addition, the control unit 60 sets the light amount non-change region 313 in a region where the light amount change region 311 is not set in each of the scanning regions SR1 to SR5.

Note that, in a case where the predetermined region AR is located in the first left region LS1, when the light distribution pattern 350 illustrated in FIG. 9 is formed, the light from the four light emitting elements 35-1 to 35-4 is superimposed on each other in the predetermined region AR. In this case, in a case where the light distribution pattern 350 illustrated in FIG. 9 is formed, the control unit 60 does not set the light amount change region 311 in some scanning regions of the scanning regions SR1 to SR4 in the light emitting elements 35-1 to 35-4 that emit light to the predetermined region AR, and sets the light amount change region 311 in other some scanning regions. Therefore, the control unit 60 does not set the light amount change region 311 in some scanning regions of the scanning regions of the light emitting elements that emit light to the predetermined region AR in the light distribution pattern 350 formed when the distance between the target object and the vehicle 100 is equal to or more than the predetermined distance, and sets the light amount change region 311 in other some scanning regions.

In addition, when the distance between the target object and the vehicle 100 is less than the predetermined distance, the number of scanning regions in which the light amount change region 311 is set changes according to the distance between the vehicle 100 and the target object. For example, in a case where the target object is the retroreflective object 401, the number increases as the distance between the vehicle 100 and the retroreflective object 401 is shorter. For example, in a case where the distance between the vehicle 100 and the retroreflective object 401 is shorter than the distance in the state illustrated in FIG. 11, the light amount change region 311 in which the distance is larger than that in the state illustrated in FIG. 10 is set. In this case, for example, the light amount change region 311 is set in the three scanning regions SR1, SR2, and SR4. Note that, for example, in a case where the target object is a human, the number of scanning regions in which the light amount change region 311 is set increases as the distance between the vehicle 100 and the human is longer. Note that the number of scanning regions in which the light amount change region 311 is set may not change according to the distance between the vehicle 100 and a retroreflective object or a human as a target object. In addition, the scanning region where the light amount change region 311 is not set is not particularly limited, and may be changed according to the position of the target object in the left-right direction with respect to the superimposition region PA.

In addition, the control unit 60 sets the second predetermined value on the basis of the information from the determination unit 50. In a case where the target object is a retroreflective object, that is, in a case where a signal indicating that the target object is a retroreflective object is input to the control unit 60, the control unit 60 sets the second predetermined value to a predetermined value lower than the first predetermined value. Note that, in a case where the target object is a human, that is, in a case where a signal indicating that the target object is a human is input to the control unit 60, the control unit 60 sets the second predetermined value to be higher than the first predetermined value. In the flowchart illustrated in FIG. 7, since the target object is the retroreflective object 401, the control unit 60 sets the second predetermined value to a predetermined value lower than the first predetermined value.

Next, in a case where the target object is the retroreflective object 401, the control unit 60 controls the light emitting elements 35-1, 35-3, and 35-5 such that the light amount of light emitted from the light emitting elements 35-1, 35-3, and 35-5 corresponding to the condensing spots SC1, SC3, and SC5 for scanning the scanning regions SR1, SR3, and SR5 where the light amount change region 311 is not set becomes the first predetermined value. In addition, in a case where the target object is the retroreflective object 401, the control unit 60 controls the light emitting elements 35-2 and 35-4 such that the light amount of light emitted from the light emitting elements 35-2 and 35-4 corresponding to the condensing spots SC2 and SC4 becomes the first predetermined value during a period in which the condensing spots SC2 and SC5 for scanning the scanning regions SR2 and SR4 in which the light amount change region 311 is set pass through the light amount non-change region 313. In addition, in a case where the target object is the retroreflective object 401, the control unit 60 controls the light emitting elements 35-2 and 35-4 such that the light amount of light emitted from the light emitting elements 35-2 and 35-4 corresponding to the condensing spots SC2 and SC4 becomes the second predetermined value during a period in which the condensing spots SC2 and SC4 pass through the light amount change region 311. Then, the processing returns to Step S1.

When the light emitting elements 35-1 to 35-5 controlled as described above emit light, the light is reflected toward the projection lens 43 by the reflector 39 rotated by the drive unit 41. The reflected light passes through the projection lens 43, is emitted to the front of the vehicle 100, and scans in the left-right direction of the vehicle 100. By this light scanning, the specific light distribution pattern 360 illustrated in FIG. 11 is formed in front of the vehicle 100. As described above, the light amount of light emitted from the light emitting elements 35-2 and 35-4 corresponding to the condensing spots SC2 and SC4 becomes the second predetermined value lower than the first predetermined value during a period in which the condensing spots SC2 and SC4 pass through the light amount change region 311. Therefore, the light amount emitted from the condensing spots SC2 and SC4 to the predetermined region AR changes so as to be smaller than the light amount in a case where the determination unit 50 determines that the retroreflective object does not satisfy the predetermined requirement. Accordingly, when the specific light distribution pattern 360 illustrated in FIG. 11 is compared with the predetermined light distribution pattern 350 illustrated in FIG. 9, the light amount of light emitted to the predetermined region AR in the specific light distribution pattern 360 is smaller than the light amount of light emitted to the region corresponding to the predetermined region AR in the predetermined light distribution pattern 350, and the light amount of light emitted to the retroreflective object 401 becomes smaller.

Here, as described above, in a case where the target object overlaps a region where at least two scanning regions overlap each other, the control unit 60 does not set the light amount change region 311 in some scanning regions, and sets the light amount change region 311 in other some scanning regions. Therefore, in the present step, the control unit 60 controls the light source unit 30 such that the light amount of light emitted from some light emitting elements to the predetermined region AR overlapping the target object does not change and the light amount of light emitted from other some light emitting elements to the predetermined region AR overlapping the target object changes among the light emitting elements that emit light to the predetermined region AR overlapping the target object in the superimposition region PA where the light from at least two light emitting elements in the light distribution pattern 350 illustrated in FIG. 9 is superimposed on each other.

Note that, in the present step, when a human as a target object is detected by the detection device 110 and the determination unit 50 determines that the human satisfies the predetermined requirement, the control unit 60 sets the second predetermined value to be higher than the first predetermined value as described above. In a case where the second predetermined value is higher than the first predetermined value, the light amount emitted from the light emitting elements 35-2 and 35-4 to the predetermined region AR is larger than the light amount in a case where the determination unit 50 determines that the human does not satisfy the predetermined requirement. When the light amount increases, the light amount emitted to the predetermined region AR overlapping the human in the specific light distribution pattern 360 when the determination unit 50 determines that the human satisfies the predetermined requirement is larger than the light amount emitted to the region corresponding to the predetermined region AR in the predetermined light distribution pattern 350 when the determination unit 50 determines that the human does not satisfy the predetermined requirement. Accordingly, the light amount of light emitted to the human is larger in a state in which the human satisfies the predetermined requirement than in a state in which the human does not satisfy the predetermined requirement.

In addition, in the present step, as described above, in a case where the distance between the retroreflective object 401, which is the target object, and the vehicle 100 is less than the predetermined distance, the number of scanning regions in which the light amount change region 311 is set increases as the distance between the vehicle 100 and the retroreflective object 401 decreases. Therefore, the closer the distance between the vehicle 100 and the retroreflective object 401, the smaller the light amount of light emitted to the retroreflective object. In addition, as described above, in a case where the distance between the human, which is the target object, and the vehicle 100 is less than the predetermined distance, the number of scanning regions in which the light amount change region 311 is set increases as the distance between the vehicle 100 and the human increases. Therefore, the farther the distance between the vehicle 100 and the human, the larger the light amount of light emitted to the human. Therefore, the control unit 60 controls the light source unit 30 such that the light amount of light emitted from some light emitting elements to the predetermined region AR overlapping the target object does not change and the light amount of light emitted from other some light emitting elements to the predetermined region AR overlapping the target object changes among the light emitting elements that emit light to the predetermined region AR overlapping the target object in the superimposition region PA described above according to the distance between the vehicle 100 and the target object.

By the way, for example, in a case where light emitted from a vehicle headlight provided in a self-vehicle irradiates a retroreflective object such as a sign, a part of the light is directed from the retroreflective object to the self-vehicle as reflected light, and glare may be given to the driver of the self-vehicle. In addition, when the light amount of light emitted from the vehicle headlight and irradiating a human such as a pedestrian is small, it may be difficult for the driver to visually recognize the human. Accordingly, there is a demand for easier driving.

Therefore, the vehicle headlight 10 of the present embodiment includes the light source unit 30, the reflector 39, and the control unit 60 that controls the light source unit 30. The light source unit 30 includes the plurality of light emitting elements 35-1 to 35-5. The reflector 39 repeats the periodic motion to reflect the light from the plurality of light emitting elements 35-1 to 35-5 and periodically scan the light to form the predetermined light distribution pattern 350. The predetermined light distribution pattern 350 includes the superimposition region PA where the light from at least two light emitting elements is superimposed on each other. In a case where a signal indicating that the target object located in front of the vehicle 100 is detected is input from the detection device 110, the control unit 60 controls the light source unit 30 such that the light amount of light emitted from some light emitting elements to the predetermined region AR overlapping the target object does not change and the light amount of light emitted from other some light emitting elements to the predetermined region AR overlapping the target object changes among the light emitting elements that emit light to the predetermined region AR overlapping the target object in the superimposition region PA.

In the vehicle headlight 10 of the present embodiment, the light distribution pattern of the emitted light changes according to the situation in front of the vehicle 100, and the light amount of light emitted to the target object changes. In addition, in the vehicle headlight 10 of the present embodiment, even in a case where a target object is detected, the light amount of light emitted from some light emitting elements to the predetermined region AR overlapping the target object does not change. Therefore, in the vehicle headlight 10 of the present embodiment, even when the light distribution pattern of the emitted light is changed, the light from some light emitting elements is emitted to the target object. When the light irradiates the target object, the difficulty in visually recognizing the target object can be suppressed and the driving can be facilitated as compared with the case where the light distribution pattern of the emitted light changes and the target object is not irradiated with the light. In addition, in the vehicle headlight 10 of the present embodiment, the number of light emitting elements that change the light amount of light emitted is smaller than that in a case where the light amount of light emitted from all the light emitting elements that emit light to the predetermined region AR overlapping the target object is changed. Therefore, with the vehicle headlight 10 of the present embodiment, the control of the light source unit 30 by the control unit 60 can be simplified as compared with such a case. Note that, in a case where the target object is detected by the detection device and the target object is the retroreflective object 401, for example, as illustrated in FIG. 11, the light amount of light emitted to the retroreflective object 401 changes. In a case where the retroreflective object 401 reflects the light from the vehicle headlight 10, the intensity of reflected light from the retroreflective object 401 to the self-vehicle tends to increase as the intensity of light emitted to the retroreflective object 401 increases. In the vehicle headlight 10 of the present embodiment, since the light amount of light emitted to the retroreflective object 401 is reduced, the intensity of light to the retroreflective object 401 is suppressed and the intensity of reflected light can be suppressed as compared with the case where the light amount of light emitted to the retroreflective object 401 does not change. Therefore, in the vehicle headlight 10 of the present embodiment, impartment of glare to the driver of the self-vehicle can be suppressed, and driving can be facilitated. In addition, in the vehicle headlight 10 of the present embodiment, in a case where the target object is detected by the detection device and the target object is a human, the light amount of light emitted to the human changes. In the vehicle headlight 10 of the present embodiment, the light amount of light emitted to the human increases, and thus, in the vehicle headlight 10, the human can be easily visually recognized and the driving can be facilitated as compared with the case where the light amount of light emitted to the human does not change. Note that the control unit 60 may determine that the target object is detected when a determination result of the determination unit 50 indicating whether the target object satisfies the predetermined requirement is input. In this case, the detection device 110 may not output the signal indicating that the target object is detected to the control unit 60.

In addition, in the vehicle headlight 10 of the present embodiment, the width of the predetermined region AR in the left-right direction overlapping the target object changes according to the distance between the vehicle 100 and the target object. From the viewpoint of the driver, the target object looks larger as the distance between the vehicle 100 and the target object is shorter. Therefore, with such a configuration, the light amount of light emitted to the target object can be appropriately changed as compared with the case where the width of the predetermined region AR in the left-right direction in which the light amount of emitted light changes does not change according to the distance between the vehicle 100 and the target object.

In addition, in the vehicle headlight 10 of the present embodiment, the control unit 60 controls the light source unit 30 such that the light amount of light emitted from some light emitting elements to the predetermined region AR overlapping the target object does not change and the light amount of light emitted from other some light emitting elements to the predetermined region AR overlapping the target object changes among the light emitting elements that emit light to the predetermined region AR overlapping the target object in the superimposition region PA described above according to the distance between the vehicle 100 and the target object. Therefore, the light amount of light emitted to the target object changes according to the distance between the vehicle 100 and the target object. The driver tends to have difficulty in visually recognizing the human as the distance between the vehicle and the human is longer. In the vehicle headlight 10 of the present embodiment, the farther the distance between the vehicle and the human, the larger the light amount of light emitted to the human. Therefore, in the vehicle headlight 10 of the present embodiment, the human can be easily visually recognized and the driving can be facilitated as compared with the case where the light amount of light emitted to the human does not change according to the distance between the vehicle 100 and the human. In addition, in a case where the retroreflective object reflects the light from the vehicle headlight 10, the intensity of reflected light from the retroreflective object to the self-vehicle tends to increase as the distance between the self-vehicle and the retroreflective object is shorter. In the vehicle headlight 10 of the present embodiment, the closer the distance between the vehicle 100 and the retroreflective object, the smaller the light amount of light emitted to the retroreflective object. Therefore, in the vehicle headlight 10 of the present embodiment, impartment of glare to the driver of the self-vehicle can be suppressed and the driving can be facilitated as compared with the case where the light amount of light emitted to the retroreflective object does not change according to the distance between the vehicle 100 and the retroreflective object.

Note that, in Step S5, the control unit 60 does not need to control other some light emitting elements such that the light amount of light emitted from other some light emitting elements different from some light emitting elements toward the predetermined region AR overlapping the target object among the light emitting elements that emit light to the predetermined region AR overlapping the target object in the superimposition region PA always becomes the second predetermined value. For example, the control unit 60 may set the light amount change region 311 in a predetermined scanning period. Then, the control unit 60 may control other some light emitting elements such that the light amount of light emitted from other some light emitting elements described above toward the predetermined region AR becomes the second predetermined value in the period in which the condensing spot passes through the light amount change region 311 in the predetermined scanning period. In addition, in a case where the number of other some light emitting elements described above is plural, the light amounts of light emitted from the plurality of light emitting elements toward the predetermined region AR may be different from each other. For example, in a case where other some light emitting elements are the two light emitting elements 35-2 and 35-4 and the target object is a retroreflective object as in the above embodiment, the control unit 60 may control the two light emitting elements 35-2 and 35-4 such that the light amount of light emitted from the light emitting element 35-2 toward the predetermined region AR becomes the second predetermined value and the light amount of light emitted from the light emitting element 35-4 toward the predetermined region AR becomes a third predetermined value lower than the second predetermined value.

In addition, in Step S5, the control unit 60 does not need to control the light source unit 30 such that the light amount of light emitted from some light emitting elements to the predetermined region AR does not change and the light amount of light emitted from other some light emitting elements to the predetermined region AR changes among the light emitting elements that emit light to the predetermined region AR overlapping the target object in the superimposition region PA according to the distance between the vehicle 100 and the target object. For example, in a case where the detection device 110 can detect a retroreflective object as a target object and can detect the intensity of light directed from the retroreflective object to the vehicle 100, the control unit 60 may control the light source unit 30 such that the light amount of light emitted from some light emitting elements to the predetermined region AR does not change and the light amount of light emitted from other some light emitting elements to the predetermined region AR decreases among the light emitting elements that emit light to the predetermined region AR overlapping the retroreflective object in the superimposition region PA according to the intensity of light directed from the retroreflective object to the vehicle 100. With such a configuration, the impartment of glare to the driver of the self-vehicle can be appropriately suppressed. Note that the detection device 110 detects the intensity of light from the retroreflective object toward the vehicle 100 on the basis of, for example, a luminance value in the captured image. In addition, for example, in a case where the detection device 110 can detect a retroreflective object as a target object and can detect an angle formed by the traveling direction of the vehicle 100 and a direction from the vehicle 100 toward the retroreflective object, the control unit 60 may control the light source unit 30 such that, as the angle is smaller, the light amount of light emitted from some light emitting elements to the predetermined region AR does not change, and the light amount of light emitted from other some light emitting elements to the predetermined region AR decreases among the light emitting elements that emit light to the predetermined region AR overlapping the retroreflective object in the superimposition region PA. In general, in a light distribution pattern of light emitted from a vehicle headlight, the intensity of light tends to increase to a center side. Therefore, the intensity of light emitted to the target object tends to increase as the angle described above decreases. Therefore, for example, by controlling the light source unit 30 such that the smaller the angle described above is, the smaller the light amount of light emitted to the predetermined region AR overlapping the retroreflective object is, the impartment of glare to the driver of the self-vehicle can be appropriately suppressed. In addition, in a case where the number of light emitting elements 35 that emit light to the predetermined region AR overlapping the target object is three or more, the control unit 60 may change the number of other some light emitting elements and change the light amount of light emitted from the other some light emitting elements to the predetermined region AR overlapping the target object.

In addition, the control unit 60 may change the scanning region in which the light amount change region 311 is set according to the position of the predetermined region AR in the left-right direction. Hereinafter, a modification in which the scanning region in which the light amount change region 311 is set changes will be described. Note that the same or equivalent components as those of the embodiment described above are designated by the same reference numerals and duplicated description will be omitted unless otherwise specified.

Figure 12:
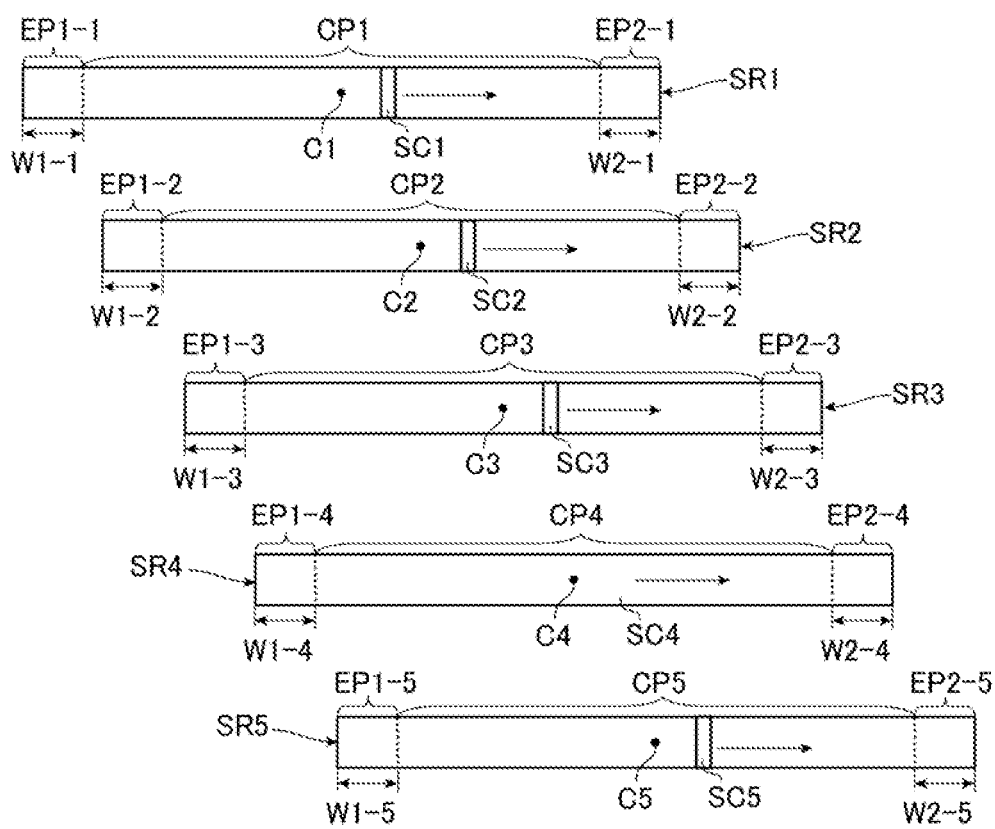
FIG. 12 is a diagram describing a scanning region in a modification of the first embodiment.

In the present modification, for example, as illustrated in FIG. 12, the scanning regions SR1 to SR5 corresponding to the respective light emitting elements 35-1 to 35-5 are divided into three regions: pairs of end portions EP1-1 to EP1-5 and EP2-1 to EP2-5, and center portions CP1 to CP5 in the left-right direction, which is the scanning direction. Note that, in FIG. 12, the scanning regions SR1 to SR5 are arranged to be displaced vertically, and the sizes of the pairs of end portions with respect to the respective scanning regions are larger than the actual sizes for easy understanding.

One end portions EP1-1 to EP1-5 are regions including the left-side ends of the scanning regions SR1 to SR5. Widths W1-1 to W1-5 in the left-right direction are widths equal to or larger than the widths of the condensing spots SC1 to SC5 in the left-right direction, and are, for example, ten times the widths of the condensing spots SC1 to SC5 in the left-right direction. The other end portions EP2-1 to EP2-5 are regions including the right-side ends of the scanning regions SR1 to SR5. Widths W2-1 to W2-5 in the left-right direction are widths equal to or larger than the widths of the condensing spots SC1 to SC5 in the left-right direction, and are, for example, ten times the widths of the condensing spots SC1 to SC5 in the left-right direction. The center portions CP1 to CP5 are regions sandwiched between the one end portions EP1-1 to EP1-5 and the other end portions EP2-1 to EP2-5.

The scanning regions SR1 to SR5 are arranged to be displaced in the left-right direction, and centers C1 to C5 of the center portions CP1 to CP5 in the left-right direction are also displaced from each other in the left-right direction. However, a part of each of the center portions CP1 to CP5 overlaps a part of the central portions of all the other scanning regions. In addition, the respective end portions EP1-1 to EP1-5 and EP2-1 to EP2-5 do not overlap the end portions of all the other scanning regions.

Figure 13:
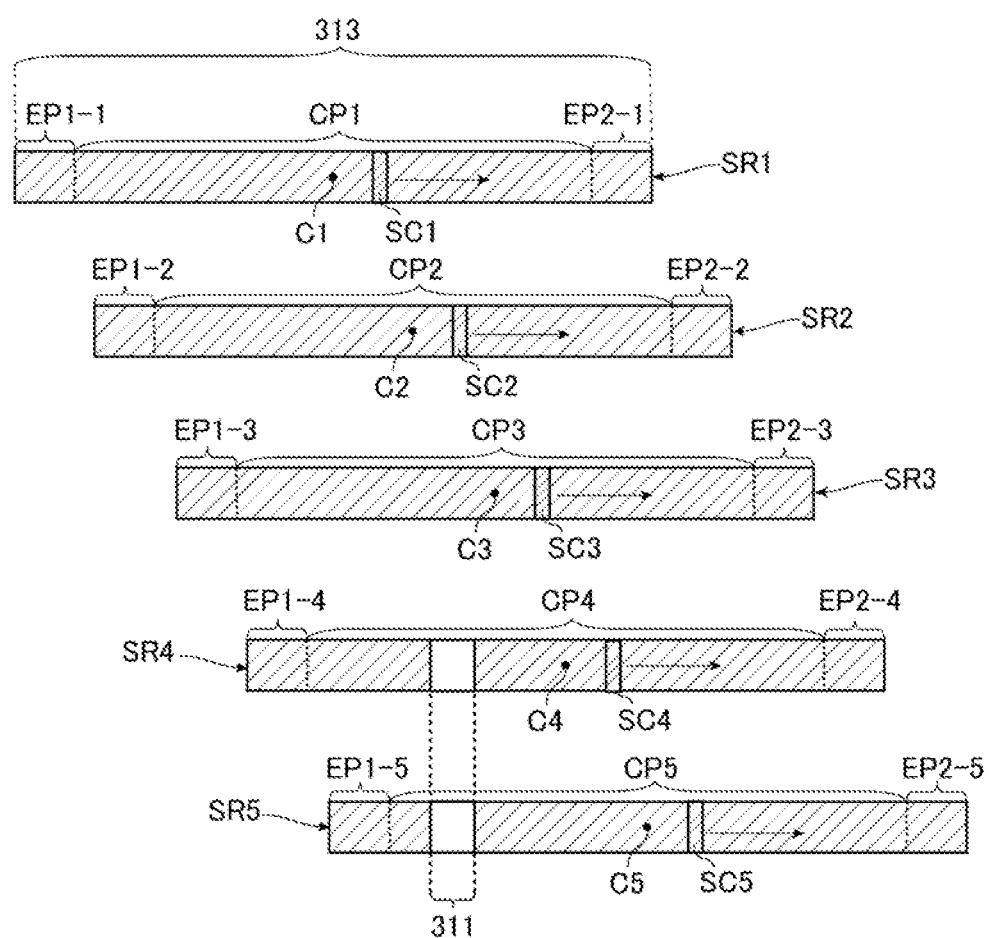
FIG. 13 is a diagram describing an example of setting of a light amount change region in Step S5 in the modification of the first embodiment.
Figure 14:
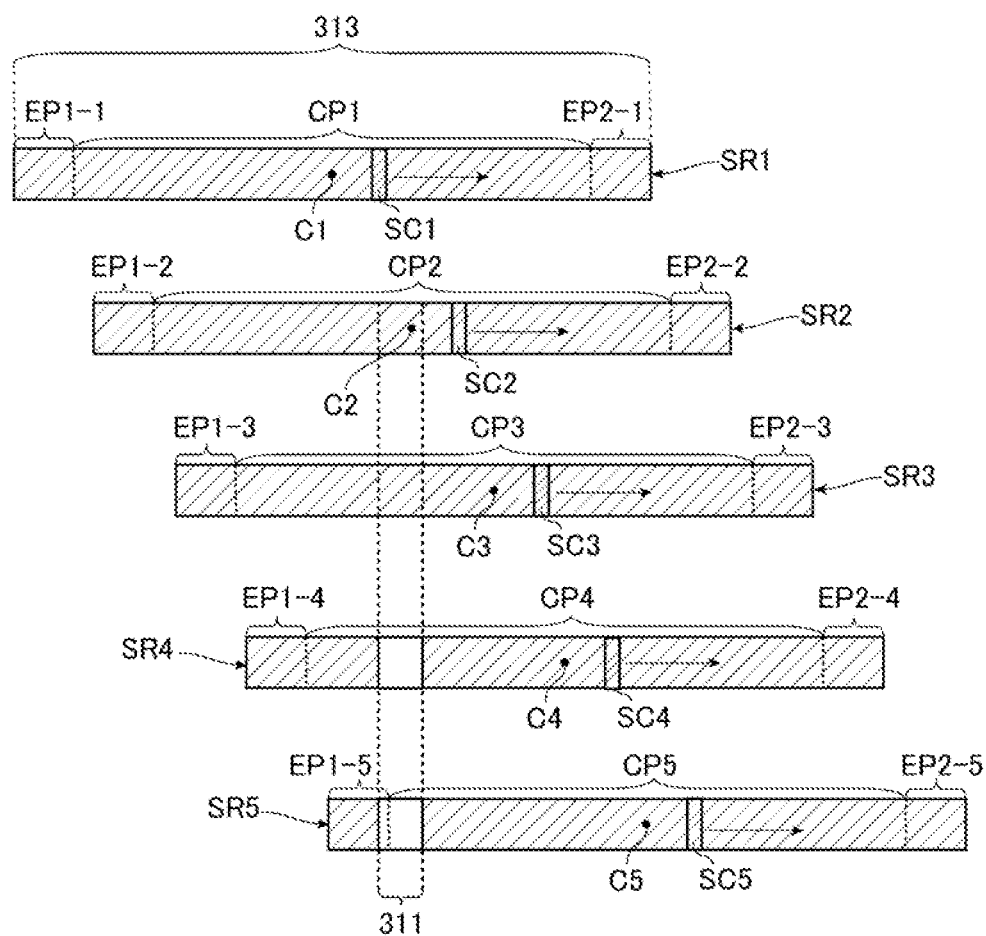
FIG. 14 is a diagram describing another example of setting of the light amount change region in Step S5 in the modification of the first embodiment.

FIG. 13 is a diagram describing an example of setting of the light amount change region 311 in Step S5 in the present modification. Note that, in FIG. 13, the sizes of the pairs of end portions with respect to the respective scanning regions are larger than the actual size for easy understanding. In addition, in FIG. 13, the light amount change region 311 is not set in the three scanning regions SR1, SR2, and SR3, and the light amount change region 311 is set in the two scanning regions SR4 and SR5 in Step S5. In addition, the predetermined region AR is located in the center portions CP4 and CP5 of all the scanning regions SR4 and SR5 in which the light amount change region 311 is set. Note that, in the example illustrated in FIG. 13, the predetermined region AR is also located in the center portions CP1 to CP3 of the scanning regions SR1 to SR3 in which the light amount change region 311 is not set. In such a state, for example, when the predetermined region AR moves in the left-right direction as the vehicle 100 moves, the light amount change region 311 also moves in the left-right direction. Therefore, as illustrated in FIG. 14, in the two scanning regions SR4 and SR5, the end portion and the light amount change region 311 may overlap each other. In other words, in the two scanning regions SR4 and SR5, the end portion may overlap the predetermined region AR. Here, in the example illustrated in FIG. 14, one end portion EP1-5 of the scanning region SR5 and the predetermined region AR overlap, and this predetermined region AR is located in the center portions CP1 to CP4 of the scanning regions SR1 to SR4.

In a case where the predetermined region AR is changed from a first state illustrated in FIG. 13 to a second state illustrated in FIG. 14, the control unit 60 controls the light source unit 30 in the manner described below. The first state is a state in which the predetermined region AR is located in the center portions CP4 and CP5 of all the scanning regions SR4 and SR5 in which the light amount change region 311 is set as illustrated in FIG. 13. In addition, the second state is a state in which, as illustrated in FIG. 14, the predetermined region AR overlaps one end portion EP1-5 of the scanning region SR5 and is located in the center portions CP1 to CP3 of the scanning regions SR1 to SR3 in which the light amount change region 311 is not set. The control unit 60 controls the light source unit 30 such that the light amount emitted to the predetermined region AR from the light emitting element corresponding to the scanning region where the end portion and the predetermined region AR overlap among the light emitting elements 35-4 and 35-5 returns to the light amount emitted to the predetermined region AR before the light amount is changed. Specifically, the control unit 60 removes the light amount change region 311 from the scanning region SR5 in which the end portion EP1-5 and the predetermined region AR overlap. Therefore, the light amount emitted to the predetermined region AR from the light emitting element 35-1 corresponding to the scanning region SR5 returns to the light amount emitted to the predetermined region AR before the light amount change region 311 is provided in the scanning region SR5. That is, the light amount emitted from the light emitting element 35-1 to the predetermined region AR returns to the light amount emitted to the predetermined region AR in a case where the determination unit 50 does not determine that the target object satisfies the predetermined requirement.

In addition, the control unit 60 controls the light source unit 30 such that the light amount emitted to the predetermined region AR in the second state becomes the light amount in the first state by changing the light amount of light emitted to the predetermined region AR from at least one light emitting element corresponding to the scanning region in which the predetermined region AR is located in the center portion among the light emitting elements 35-1 to 35-3. Here, in the present modification, similarly to the above embodiment, the light amount of light emitted from each light emitting element 35-*i* when the condensing spot SCi passes through the light amount non-change region 313 is the first predetermined value. Therefore, the control unit 60 provides the light amount change region 311 in one scanning region corresponding to the scanning region in which the predetermined region AR is located in the center portion among the three scanning regions SR1 to SR3. Here, since the end portions of the three scanning regions SR1 to SR3 do not overlap the predetermined region AR, the light amount change region 311 is provided in any one of the three scanning regions SR1 to SR3. In the present modification, the control unit 60 provides the light amount change region 311 in the scanning region SR2 in which the distance between the predetermined region AR and the centers C1 to C3 of the center portions CP1 to CP3 in the left-right direction is the shortest among the three scanning regions SR1 to SR3. Therefore, the light amount emitted from the light emitting element 35-2 corresponding to the scanning region SR2 to the predetermined region AR changes, and the light amount emitted to the predetermined region AR in the second state becomes the light amount in the first state. Then, the processing returns to Step S1 from Step S5. Note that it is sufficient if the control unit 60 controls the light source unit 30 such that the light amount emitted to the predetermined region AR in the second state becomes the light amount in the first state by providing the light amount change region 311 in any one of the three scanning regions SR1 to SR3. A method of selecting the scanning region is not particularly limited, and the light amount change region 311 may be provided in a plurality of scanning regions. When the light amount change region 311 is provided in the plurality of scanning regions, the light amount of light emitted from the light emitting element when the condensing spot passes through the light amount change region 311 is adjusted such that the light amount emitted to the predetermined region AR in the second state becomes the light amount in the first state.

Here, in the present modification, as in the above-described embodiment, a light distribution pattern is formed by periodic scanning of light from the plurality of light emitting elements 35-1 to 35-5. In such a vehicle headlight, for example, when the predetermined region AR overlapping the target object is located in the vicinity of an end in the scanning direction of the scanning region SR1 through which the condensing spot SCi of light from the light emitting element 35-*i* passes, the distance between this end and the predetermined region AR may be narrower than the width of the condensing spot SCi in the scanning direction. By the way, the shortest length that allows light scanning is the width of the condensing spot SCi in the scanning direction. Therefore, in the case as described above, the light amount emitted to the predetermined region AR cannot be changed without changing the light amount emitted between the end and the predetermined region AR. Therefore, the light amount emitted between the above-described end and the predetermined region AR is also changed together with the predetermined region AR, and the region where the light amount is changed may suddenly become large, and the driver may feel a sense of discomfort.

The vehicle headlight 10 of the present modification further includes the determination unit 50 that determines whether the target object satisfies the predetermined requirement that the light amount of light reflected from the target object is equal to or more than the predetermined value when a signal indicating the state of the target object is input from the detection device 110. In addition, in the vehicle headlight 10 of the present modification, as described above, the scanning regions SR1 to SR5 through which the condensing spots SC1 to SC5 of the light from the light emitting elements 35-1 to 35-5 scanned by the reflector 39 in the predetermined light distribution pattern 350 pass are divided into the pairs of end portions EP1-1 to EP1-5 and EP2-1 to EP2-5 and the center portions CP1 to CP5. One end portions EP1-1 to EP1-5 are regions including the left-side ends of the scanning regions SR1 to SR5, and the other end portions EP2-1 to EP2-5 are regions including the right-side ends of the scanning regions SR1 to SR5. The center portions CP1 to CP5 are regions sandwiched between the one end portions EP1-1 to EP1-5 and the other end portions EP2-1 to EP2-5 in the scanning direction. The widths of the end portions EP1-1 to EP1-5 and EP2-1 to EP2-5 in the scanning direction in the scanning regions SR1 to SR5 are equal to or larger than the widths of the condensing spots SC1 to SC5 in the scanning direction. The scanning regions SR1 to SR5 are arranged to be displaced in the scanning direction, a part of the center portions CP1 to CP5 of the scanning regions SR1 to SR5 overlaps a part of the center portions of all the other scanning regions, and the end portions EP1-1 to EP1-5 and EP2-1 to EP2-5 of the scanning regions SR1 to SR5 do not overlap the end portions of all the other scanning regions. Then, in a case where the predetermined region AR is changed from the first state to the second state, the control unit 60 controls the light source unit 30 in the manner described below. The first state here is a state in which the predetermined region AR is located in the center portions CP4 and CP5 of all the scanning regions SR4 and SR5 corresponding to the light emitting elements 35-4 and 35-5 in which the light amount of light emitted to the predetermined region AR is changed. In addition, the second state is a state in which the predetermined region AR overlaps an end portion of at least one scanning region corresponding to the light emitting elements 35-4 and 35-5 in which the light amount of light emitted to the predetermined region AR is changed as the predetermined region AR moves in the scanning direction, and the predetermined region AR is located in the center portion in the scanning region corresponding to at least one light emitting element of the light emitting elements 35-1 to 35-3 in which the light amount of light emitted to the predetermined region AR is not changed. The control unit 60 controls the light source unit 30 such that the light amount emitted to the predetermined region AR from the light emitting element 35-5 corresponding to the scanning region SR5 in which the predetermined region AR overlaps the end portion among the light emitting elements 35-4 and 35-5 in which the light amount of light emitted to the predetermined region AR is changed returns to the light amount emitted to the predetermined region AR in a case where the determination unit 50 does not determine that the target object satisfies the predetermined requirement. Therefore, with the vehicle headlight 10 of the present modification, the distance between the predetermined region AR and the end of the scanning region corresponding to the light emitting element in which the light amount of light emitted to the predetermined region AR is changed can be prevented from being less than the width of the condensing spot in the scanning direction. In addition, the control unit 60 controls the light source unit 30 such that the light amount emitted to the predetermined region AR in the second state becomes the light amount in the first state by changing the light amount emitted to the predetermined region AR from at least one light emitting element corresponding to the scanning region in which the predetermined region AR is located in the center portion among the light emitting elements 35-1 to 35-3 in which the light amount of light emitted to the predetermined region AR is not changed. Therefore, with the vehicle headlight 10 of the present modification, a change in the light amount emitted to the vicinity of the predetermined region AR can be suppressed, the brightness of the predetermined region AR can be prevented from changing, and the driver can be suppressed from feeling a sense of discomfort.

In addition, in the vehicle headlight 10 of the present modification, the predetermined region AR in the second state is located in the center portion of the scanning region corresponding to two or more light emitting elements among the light emitting elements 35-1 to 35-3 in which the light amount of light emitted to the predetermined region AR is not changed. Then, in the case of changing from the first state to the second state, the light amount emitted to the predetermined region AR from the light emitting element 35-2 corresponding to the scanning region SR2 having the shortest distance between the predetermined region AR and the centers C1 to C3 in the scanning direction of the center portions CP1 to CP3 among the two or more light emitting elements of the light emitting elements 35-1 to 35-3 in which the light amount of light emitted to the predetermined region AR is not changed changes. Therefore, even when the predetermined region AR further moves to one side or the other side in the scanning direction, the end portion of the scanning region SR2 corresponding to the light emitting element 35-2 in which the light amount of light emitted to the predetermined region AR is changed in the case of changing from the first state to the second state and the predetermined region AR can be made less likely to overlap each other. Accordingly, with the vehicle headlight 10 of the present modification, it is possible to suppress an increase in the number of times the control unit 60 controls the light source unit 30 as described above.

Note that, in the present modification, the light amount change region 311 is provided in the scanning regions SR4 and SR5 in the first state. However, the scanning region in which the light amount change region 311 is provided and the number of scanning regions in which the light amount change region 311 is provided are not particularly limited. In addition, the length of each scanning region in the scanning direction is also not particularly limited. In addition, the widths of the end portions in these scanning regions may be different from each other or may be the same. In addition, the widths of these scanning regions in a direction perpendicular to the scanning direction may be different from each other or may be the same. In addition, these scanning regions may also be displaced in the scanning direction and also in a direction perpendicular to the scanning direction. In addition, a part of the light distribution pattern may be formed by scanning light from the five light emitting elements 35-1 to 35-5, and another part of the light distribution pattern may be formed by scanning light from another light emitting element.

Second Embodiment

Next, a second embodiment as a second aspect of the present invention will be described. Note that the same or equivalent components as those of the first embodiment are designated by the same reference numerals and duplicated description will be omitted unless otherwise specified. In a vehicle headlight 10 of the present embodiment, the configuration of a light source unit 30 in lighting tools 20a and 20b is different from the configuration of the light source unit 30 in the lighting tools 20a and 20b of the first embodiment. Since the configurations of the lighting tools 20a and 20b of the present embodiment are the same, the configurations of the lighting tools 20a and 20b will be described using the lighting tool 20a.

Figure 15:
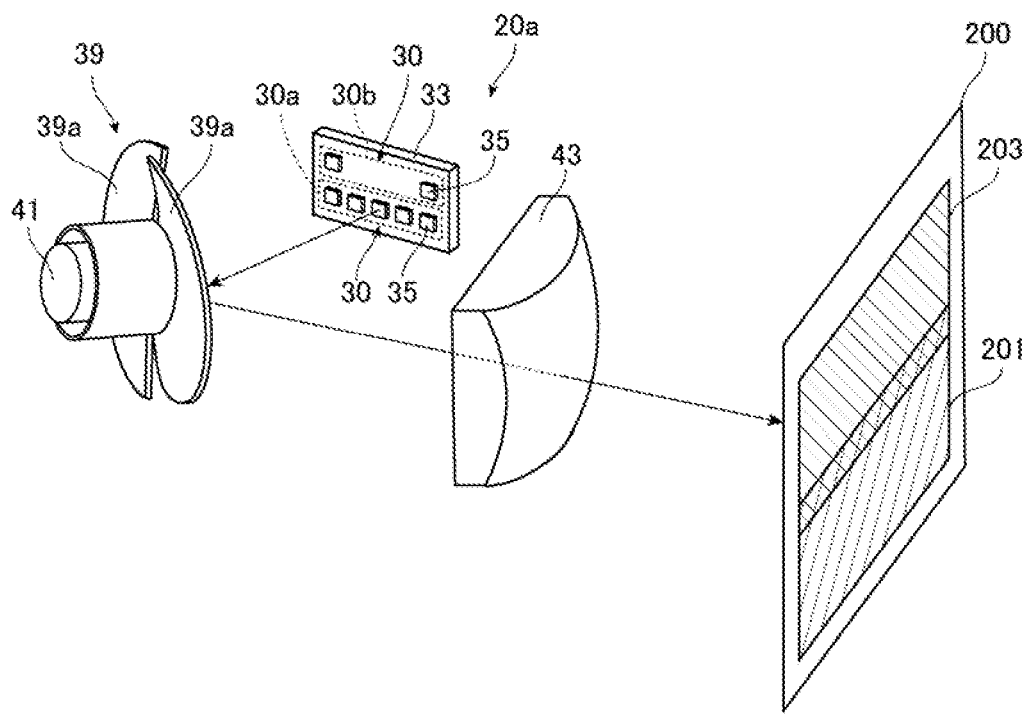
FIG. 15 is a diagram schematically illustrating one lighting tool of a second embodiment.

FIG. 15 is a diagram schematically illustrating the lighting tool 20a of the present embodiment. As illustrated in FIG. 15, in the lighting tool 20a of the present embodiment, a plurality of light source units 30 is arranged.

In FIG. 15, each light source unit 30 is indicated by the broken line. The broken line is described for convenience in order to illustrate each light source unit 30, and does not mean that the shape of each light source unit 30 is a broken line-like shape. The light source units 30 are arranged in a row along one direction which is the up-down direction in the sheet of paper of FIG. 15. In addition, each light source unit 30 includes a plurality of light emitting elements 35 mounted on a circuit board 33. The plurality of light emitting elements 35 is arranged in a row along another direction different from the one direction. The other direction is, for example, a direction orthogonal to the one direction. FIG. 15 illustrates an example in which the two light source units 30 are arranged in a row along the one direction. In addition, FIG. 15 illustrates an example in which five light emitting elements 35 are arranged in a row along the other direction in some light source unit 30a among the plurality of light source units 30, and two light emitting elements 35 are arranged in a row along the other direction in other some light source unit 30b. The light source unit 30a corresponds to the light source unit 30 of the first embodiment. Note that the number of light source units 30 and the number of light emitting elements 35 in each light source unit 30 are not particularly limited. In addition, for example, each light source unit 30 may be configured to include one light emitting element 35.

In each light source unit 30, power is supplied to each light emitting element 35 via the circuit board 33. The light amount of light emitted from each light emitting element 35 is adjusted by adjusting the power supplied to each light emitting element 35. Light is emitted toward a reflector 39. Reflection blades 39a of the reflector 39 reflect light from the plurality of light source units 30 toward a projection lens 43.

In the present embodiment, when the plurality of light source units 30 emit light toward the reflector 39 and the reflector 39 rotates, the reflector 39 repeats a periodic motion to reflect the light from the plurality of light source units 30 toward the projection lens 43 side, and scans the light in the left-right direction of a vehicle 100. The light passes through the projection lens 43, is emitted to the front of the vehicle 100, and scanned in the left-right direction of the vehicle 100, and a first light distribution pattern 201 and a second light distribution pattern 203 are formed on a vertical plane 200 in front of the vehicle 100. The first light distribution pattern 201 is a light distribution pattern formed by scanning the light from the light source unit 30a, and the second light distribution pattern 203 is a light distribution pattern formed by scanning the light from the light source unit 30b. The first light distribution pattern 201 partially overlaps the second light distribution pattern 203 in the up-down direction of the vehicle 100. For example, when the first light distribution pattern 201 and the second light distribution pattern 203 have a rectangular shape horizontally long in the left-right direction of the vehicle 100, an upper end portion of the first light distribution pattern 201 overlaps a lower end portion of the second light distribution pattern 203. Here, the reflector 39 reflects the light from the plurality of light source units 30 such that the first light distribution pattern 201 partially overlaps the second light distribution pattern 203 in the up-down direction of the vehicle 100. Note that, in FIG. 15, the first light distribution pattern 201 and the second light distribution pattern 203 are illustrated in a rectangular shape, but the shape of the first light distribution pattern 201 and the second light distribution pattern 203 is not limited to a rectangular shape.

Figure 16:
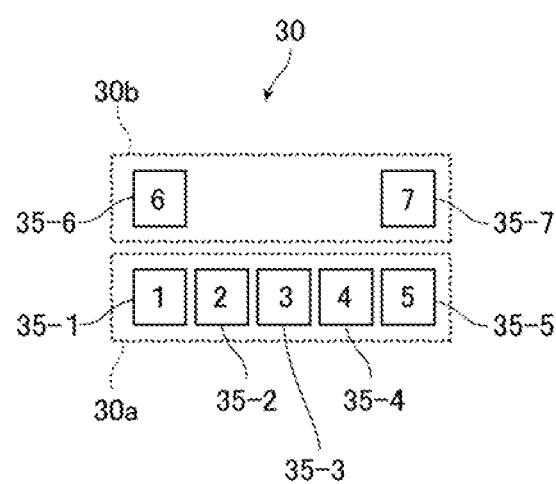
FIG. 16 is a diagram illustrating a layout of light emitting elements of a plurality of light source units of the second embodiment.
Figure 17:
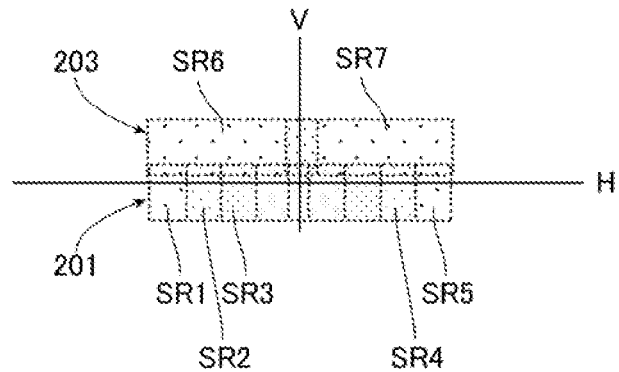
FIG. 17 is a diagram illustrating a scanning region through which a condensing spot of light from each light emitting element of the second embodiment passes.

FIGS. 16 and 17 are diagrams describing formation of the first light distribution pattern 201 and the second light distribution pattern 203.

FIG. 16 is a diagram illustrating a layout of light emitting elements 35-1 to 35-7 of the plurality of light source units 30 of the present embodiment. As described above, the light source unit 30a includes the five light emitting elements 35-1 to 35-5, and the light source unit 30b includes the two light emitting elements 35-6 to 35-7.

FIG. 17 is a diagram illustrating scanning regions SR1 to SR7 through which condensing spots of light pass when the light from the light emitting elements 35-1 to 35-7 is scanned by the reflector 39 to form the first light distribution pattern 201 and the second light distribution pattern 203. A scanning region SR1 of the present embodiment indicates a region through which a condensing spot formed by light from an i-th ($1 \leq i \leq 7$) light emitting element 35-i passes. A set of the scanning regions SR1 to SR5 corresponds to the first light distribution pattern 201, and a set of the scanning regions SR6 to SR7 corresponds to the second light distribution pattern 203.

Since the arrangement of the scanning regions SR1 to SR5 of the present embodiment is the same as that of the scanning regions SR1 to SR5 of the first embodiment, the description thereof will be omitted. In FIG. 17, reference numerals of regions CA, LS1 to LS4, and RS1 to RS4 illustrated in FIG. 4 are omitted for clarity of illustration.

The scanning regions SR6 to SR7 have a rectangular shape horizontally long in the left-right direction of the vehicle 100 and have substantially the same size. The scanning region SR6 is wider than the scanning region SR1. The positions of the scanning regions SR6 to SR7 in the up-down direction are substantially the same, and the positions in the left-right direction are different. Accordingly, the scanning regions SR6 to SR7 are arranged to be displaced from each other in the left-right direction such that a part of each of the scanning regions SR6 to SR7 overlaps a part of another scanning region. The overlapping region overlaps a vertical line V and is located above a horizontal line H. In addition, a lower end portion of each of the scanning regions SR6 to SR7 overlaps a part of an upper end portion of each of the scanning regions SR1 to SR5. The overlapping region is located above the horizontal line H.

Figure 18:
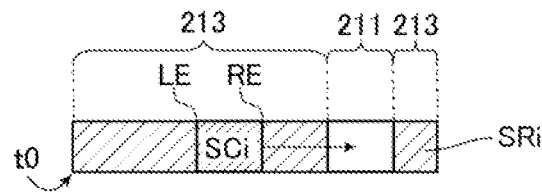
FIG. 18 is a diagram illustrating a scanning region of the second embodiment.

FIG. 18 is a diagram describing control of the light emitting element 35-i in the scanning region SR1. FIG. 18 is a diagram illustrating the scanning region SR1. In the scanning region SR1 illustrated in FIG. 18, a non-hatched range indicates a non-irradiation region 211, and a hatched range indicates an irradiation region 213. The non-irradiation region 211 indicates a region not irradiated with light in the first light distribution pattern 201 and the second light distribution pattern 203, or a region irradiated with light in a small light amount not giving glare to the driver of the vehicle 100 by reflected light from a retroreflective object in the first light distribution pattern 201 and the second light distribution pattern 203. The irradiation region 213 indicates a region irradiated with light in the first light distribution pattern 201 and the second light distribution pattern 203. The light amount in the irradiation region 213 is larger than the light amount in the non-irradiation region 211. The time chart of the present embodiment illustrating the turn-on/turn-off state of the light emitting element 35-i is the same as the time chart illustrated in FIG. 6.

In the irradiation region 213, a control unit 60 controls the luminance of the light emitting element 35-i such that the light amount of light emitted from the light emitting element 35-i corresponding to the condensing spot SCi becomes a first predetermined value during a period in which the condensing spot SCi passes through the irradiation region 213. The first predetermined value indicates a value of the light amount of light emitted from the light emitting element 35-i in the irradiation region 213. In addition, the first predetermined value is, for example, the maximum value of the light amount of light emitted from the light emitting element 35-i, 80% of the maximum value, or the like.

In addition, in the non-irradiation region 211, the control unit 60 controls the luminance of the light emitting element 35-i such that the light amount of light emitted from the light emitting element 35-i corresponding to the condensing spot SCi becomes a second predetermined value during a period in which the condensing spot SCi passes through the non-irradiation region 211. Specifically, as illustrated in FIGS. 6 and 18, the control unit 60 controls the light amount of light emitted from the light emitting element 35-i to the second predetermined value at timing to at which a right end RE of the condensing spot SCi reaches the non-irradiation region 211, and controls the light amount of light emitted from the light emitting element 35-i to the first predetermined value at timing tB at which a left end LE of the condensing spot SCi reaches a right end of the non-irradiation region 211. The second predetermined value indicates a value of the light amount of light emitted from the light emitting element 35-i in the non-irradiation region 211. The second predetermined value of the present embodiment is a value smaller than the first predetermined value. The second predetermined value is, for example, 30% of the maximum value of the light amount, zero, or the like. When the second predetermined value is zero, the light from the light emitting element 35-i is turned off.

Next, the operation of the vehicle headlight 10 in the present embodiment will be described. A control flowchart of the operation includes Steps S1 to S5 similarly to the control flowchart of the first embodiment. Since Steps S1 to S3 of the present embodiment are the same as Steps S1 to S3 of the first embodiment, the description thereof will be omitted. Steps S4 to S5 of the present embodiment are different from Steps S4 to S5 of the first embodiment, and will be described below. Note that a target object of the present embodiment is a retroreflective object located diagonally forward left of the vehicle 100. In addition, hereinafter, the distance between the retroreflective object and the vehicle 100 may be simply referred to as a distance.

(Step S4)

Figure 19:
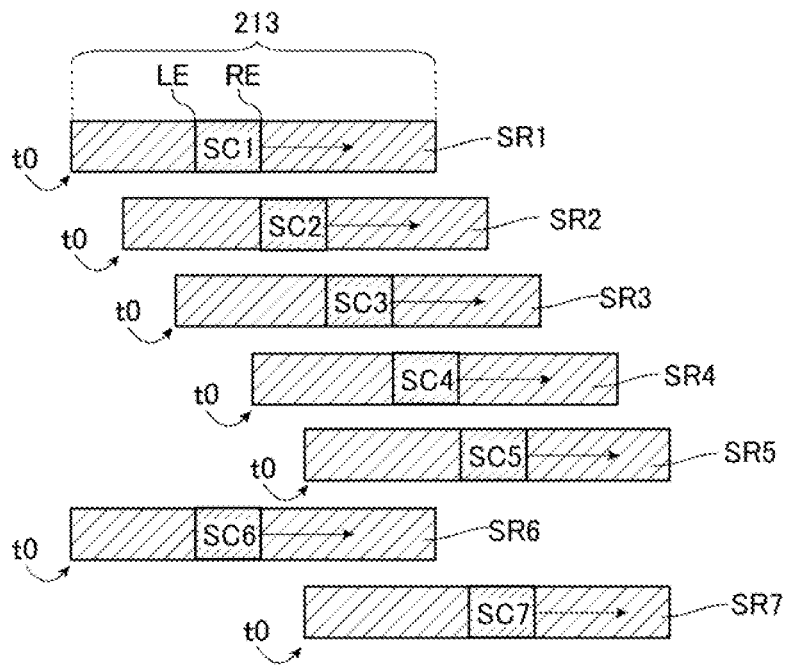
FIG. 19 is a diagram describing scanning of a condensing spot in Step S4.
Figure 20:
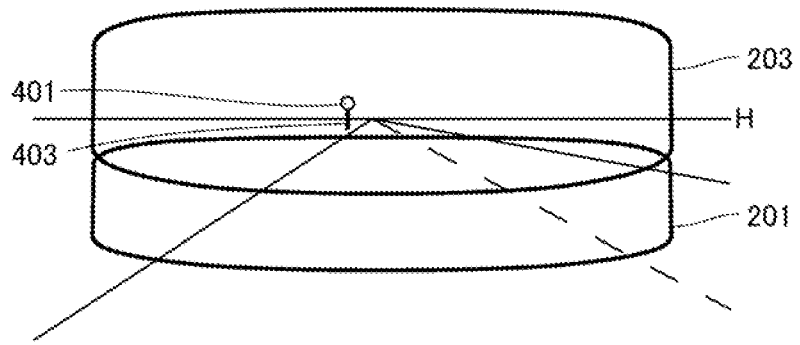
FIG. 20 is a diagram illustrating a first light distribution pattern and a second light distribution pattern in Step S4.

In the present step, as in Step S4 of first embodiment, the retroreflective object is detected by a detection device 110, and the distance is equal to or more than a predetermined distance, or the retroreflective object is not detected by the detection device 110. In this case, the control unit 60 controls the driving of the plurality of light source units 30 and also controls the driving of a drive unit 41. FIG. 19 is a diagram describing scanning of condensing spots SC1 to SC7 in the present step. FIG. 20 is a diagram illustrating the first light distribution pattern 201 and the second light distribution pattern 203 in a case where the distance is equal to or more than a predetermined distance. The first light distribution pattern 201 and the second light distribution pattern 203 illustrated in FIG. 20 are the same as the first light distribution pattern 201 and the second light distribution pattern 203 illustrated in FIG. 15.

Here, first, scanning of the condensing spots SC1 to SC7 in the present step will be described with reference to FIG. 19. In FIG. 19, the plurality of scanning regions SR1 to SR7 is displaced and arranged for easy viewing. The condensing spots SC1 to SC7 scan the scanning regions SR1 to SR7 from the left to the right in the drawing. When the distance is equal to or more than the predetermined distance and when the retroreflective object is not detected by the detection device 110, the control unit 60 sets each of the scanning regions SR1 to SR7 as the irradiation region 213. Next, the control unit 60 controls the light emitting elements 35-1 to 35-7 such that the light amount of light emitted from the light emitting elements 35-1 to 35-7 corresponding to the condensing spots SC1 to SC7 becomes the first predetermined value.

When the light emitting elements 35-1 to 35-7 controlled as described above emit light, the light is reflected toward the projection lens 43 by the rotating reflector 39. In addition, the light passes through the projection lens 43, is emitted to the front of the vehicle 100, and scans in the left-right direction of the vehicle 100. By this light scanning, the first light distribution pattern 201 and the second light distribution pattern 203 are formed in front of the vehicle 100 as illustrated in FIG. 20. As illustrated in FIG. 20, when a retroreflective object 401 is a road sign installed in the vicinity of the road, the retroreflective object 401 is supported by, for example, a support portion 403 that is a metal pillar erected from the vicinity of the road. In FIG. 20, H indicates a horizontal line, the first light distribution pattern 201 and the second light distribution pattern 203 are indicated by the thick lines, and the first light distribution pattern 201 and the second light distribution pattern 203 are a light distribution pattern formed on a vertical plane, for example, 25 m away from the vehicle 100. The first light distribution pattern 201 partially overlaps the second light distribution pattern 203 in the up-down direction of the vehicle 100.

Figure 21:
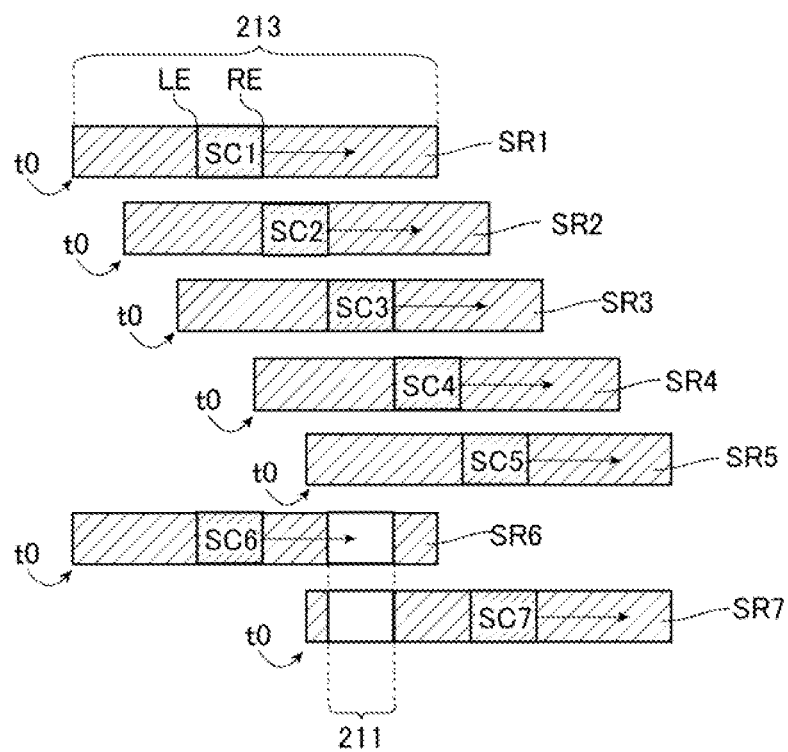
FIG. 21 is a diagram describing scanning of a condensing spot in Step S5.
Figure 22:
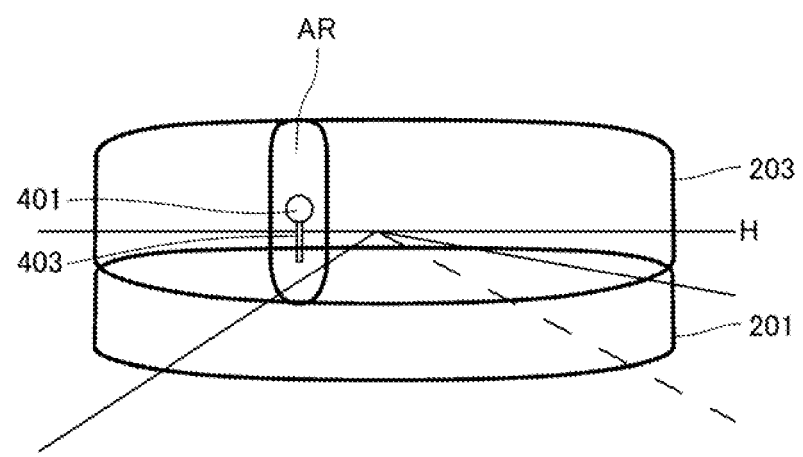
FIG. 22 is a diagram illustrating a first light distribution pattern and a second light distribution pattern in Step S5.

(Step S5) In the present step, the retroreflective object is detected by the detection device 110, and the distance is less than the predetermined distance. In this case, the control unit 60 controls the driving of the plurality of light source units 30 and also controls the driving of a drive unit 41. FIG. 21 is a diagram describing scanning of condensing spots SC1 to SC7 in the present step. FIG. 22 is a diagram illustrating the first light distribution pattern 201 and the second light distribution pattern 203 in a case where the distance is less than the predetermined distance. Here, the description will be given assuming that the upper end portion of the first light distribution pattern 201 partially overlaps the lower end portion of the second light distribution pattern 203 in the up-down direction of the vehicle 100, and the retroreflective object overlaps the second light distribution pattern 203, which is one of the first light distribution pattern 201 and the second light distribution pattern 203.

In the present step, the control unit 60 detects a predetermined region AR where the retroreflective object overlaps in the second light distribution pattern 203 on the basis of a signal from a determination unit 50, and sets the predetermined region AR as the non-irradiation region 211. The signal indicates the state of a target object such as the presence position of the retroreflective object. Next, the control unit 60 controls driving of the light source unit 30a that emits light for forming the first light distribution pattern 201 and driving of the light source unit 30b that emits light for forming the second light distribution pattern 203. The driving of the light source unit 30a and the light source unit 30b in the present step will be described below.

Here, first, scanning of the condensing spots SC1 to SC7 in the present step will be described with reference to FIG. 21. In FIG. 21, similarly to FIG. 19, the plurality of scanning regions SR1 to SR7 is displaced and arranged for easy viewing. The condensing spots SC1 to SC7 scan the scanning regions SR1 to SR7 from the left to the right in the drawing.

First, driving of the light source unit 30a will be described. The control unit 60 sets each of the scanning regions SR1 to SR5 as the irradiation region 213. Next, the control unit 60 controls the light emitting elements 35-1 to 35-5 such that the light amount of light emitted from the light emitting elements 35-1 to 35-5 corresponding to the condensing spots SC1 to SC5 becomes the first predetermined value.

Next, driving of the light source unit 30b will be described. The control unit 60 sets the non-irradiation region 211 in a part of each of the scanning regions SR6 to SR7, and sets the irradiation region 213 in another part of each of the scanning regions SR6 to SR7. The control unit 60 controls the light emitting elements 35-6 and 35-7 such that the light amount of light emitted from the light emitting elements 35-6 and 35-7 corresponding to the condensing spots SC6 and SC7 becomes the first predetermined value during a period in which the condensing spots SC6 and SC7 pass through the irradiation region 213. In addition, the control unit 60 controls the light emitting elements 35-6 and 35-7 such that the light amount of light emitted from the light emitting elements 35-6 and 35-7 corresponding to the condensing spots SC6 and SC7 becomes the second predetermined value during a period in which the condensing spots SC6 and SC7 pass through the non-irradiation region 211.

When the light emitting elements 35-1 to 35-7 controlled as described above emit light, the light is reflected toward the projection lens 43 by the rotating reflector 39. In addition, the light passes through the projection lens 43, is emitted to the front of the vehicle 100, and scanned in the left-right direction of the vehicle 100, and the first light distribution pattern 201 and the second light distribution pattern 203 are formed in front of the vehicle 100.

In the present step, in a case where the determination unit 50 determines that the retroreflective object 401 satisfies a predetermined requirement, the light amount of light emitted to the predetermined region AR overlapping the retroreflective object 401 in the second light distribution pattern 203, which is one of the first light distribution pattern 201 and the second light distribution pattern 203, is smaller than that in a case where the determination unit 50 determines that the retroreflective object 401 does not satisfy the predetermined requirement. Thus, the second light distribution pattern 203 is projected in front of the vehicle 100 in a state where the light amount in the retroreflective object 401 is smaller than that in the second light distribution pattern 203 in Step S4.

Next, an example of control of the second predetermined value will be described using numerical values. The second predetermined value is a value of the light amount of light emitted to the predetermined region AR. The numerical values used here are described for convenience so that the magnitude relationship of the light amount can be easily imaged, and do not indicate actual numerical values of the light amount of light emitted to the predetermined region AR.

Here, the description will be given assuming that light emitted from the light emitting element 35-6 of the light source unit 30b that emits light emitted to the predetermined region AR is referred to as first light, and the light amount of the first light is referred to as a first light amount. In addition, the description will be given assuming that light emitted from the light emitting element 35-7 of the light source unit 30b is referred to as second light, and the light amount of the second light is referred to as a second light amount.

In a case where the distance is equal to or more than the predetermined distance, for example, the control unit 60 controls the light source unit 30b such that the first light amount becomes "100" and the second light amount becomes "100". In this case, the sum of the first light amount and the second light amount is "200".

On the other hand, in a case where the distance is less than the predetermined distance, the control unit 60 controls the light source unit 30b such that the first light amount becomes "80" and the second light amount becomes "80". In this case, the sum of the first light amount and the second light amount is "160".

Next, a comparison between the sum "200" of the first light amount and the second light amount in a case where the distance is equal to or more than the predetermined distance and the sum "160" of the first light amount and the second light amount in a case where the distance is less than the predetermined distance will be described. Comparing the sums, the control unit 60 controls the light source unit 30b such that the sum of the first light amount and the second light amount becomes smaller in a case where the distance is less than the predetermined distance than in a case where the distance is equal to or more than the predetermined distance. Next, a comparison between the first light amount "100" and the second light amount "100" in a case where the distance is equal to or more than the predetermined distance and the first light amount "80" and the second light amount "80" in a case where the distance is less than the predetermined distance will be described. Comparing them, the control unit 60 controls the light source unit 30b such that each of the first light amount and the second light amount becomes smaller in a case where the distance is less than the predetermined distance than in a case where the distance is equal to or more than the predetermined distance.

Note that, in the present embodiment, it is sufficient if the sum of the first light amount and the second light amount becomes smaller in a case where the distance is less than the predetermined distance than in a case where the distance is equal to or more than the predetermined distance as described above. For example, the control unit 60 may control the light source unit 30b such that one of the first light amount and the second light amount becomes "80" and the other becomes "100". Here, a comparison between the first light amount "100" and the second light amount "100" in a case where the distance is equal to or more than the predetermined distance and the first light amount "80" and the second light amount "100" in a case where the distance is less than the predetermined distance will be described. Comparing them, the control unit 60 controls the light source unit 30b such that the first light amount becomes smaller and the second light amount becomes the same in a case where the distance is less than the predetermined distance than in a case where the distance is equal to or more than the predetermined distance.

When the sum of the first light amount and the second light amount is controlled as described above, the processing returns to Step S1.

By the way, in a case where light from a vehicle headlight provided in a self-vehicle irradiates a retroreflective object such as a sign, a part of the light is directed from the retroreflective object to the self-vehicle as reflected light, and glare may be given to the driver of the self-vehicle. Thus, there is a concern that the driver's visibility is reduced.

Therefore, the vehicle headlight 10 of the present embodiment includes the plurality of light source units 30, the reflector 39 that repeats a periodic motion to reflect light from the plurality of light source units 30 and scans the light in the left-right direction of the vehicle 100, and the control unit 60 that controls the plurality of light source units 30. The reflector 39 reflects the light from the plurality of light source units 30 such that the first light distribution pattern 201 formed by scanning of light from some light source unit 30a of the plurality of light source units 30 and the second light distribution pattern 203 formed by scanning of light from other some light source unit 30b of the plurality of light source units 30 partially overlap each other in the up-down direction of the vehicle 100. When the signal indicating that the retroreflective object located in front of the vehicle 100 is detected is input from the detection device 110, the control unit 60 controls the plurality of light source units 30 such that the light amount of light emitted to the predetermined region AR overlapping the retroreflective object in the second light distribution pattern 203, which is one of the first light distribution pattern 201 and the second light distribution pattern 203, is reduced as compared with the case where the signal indicating that the retroreflective object is not detected is input from the detection device 110.

In a case where the retroreflective object reflects the light, the intensity of reflected light from the retroreflective object to the self-vehicle tends to increase as the intensity of light from the light source units 30 to the retroreflective object increases. Here, a case where the signal indicating that the retroreflective object is detected is input to the control unit 60 from the detection device 110 is compared with the case where the signal indicating that the retroreflective object is not detected is input to the control unit 60 from the detection device 110. When the signal indicating that the retroreflective object is detected is input to the control unit 60, as compared with the case where the signal indicating that the retroreflective object is not detected is input to the control unit 60, the light amount of light emitted to the predetermined region AR overlapping the retroreflective object in the second light distribution pattern 203, which is one of the first light distribution pattern 201 and the second light distribution pattern 203, is reduced. The light is a part of the light forming the second light distribution pattern 203. When the light amount of light decreases, the intensity of light to the retroreflective object is suppressed, and the intensity of the reflected light from the retroreflective object can be suppressed, as compared with the case where the light amount does not decrease. Thus, even when the reflected light travels to the self-vehicle, impartment of glare to the driver of the self-vehicle can be suppressed. Accordingly, with the vehicle headlight 10, a reduction in driver's visibility can be suppressed.

Note that the vehicle headlight 10 of the present embodiment may further include the determination unit 50 that determines whether the retroreflective object satisfies the predetermined requirement that the light amount of light reflected from the retroreflective object is equal to or more than the predetermined value in a case where the signal indicating the state of the retroreflective object is input from the detection device 110, and the control unit 60 may control the plurality of light source units 30 such that the light amount of light emitted to the predetermined region AR overlapping the retroreflective object in the second light distribution pattern 203, which is one of the first light distribution pattern 201 and the second light distribution pattern 203, is reduced in a case where the determination unit 50 determines that the retroreflective object satisfies the predetermined requirement as compared with the case where the determination unit 50 determines that the retroreflective object does not satisfy the predetermined requirement. Also in this case, as described above, the intensity of light to the retroreflective object is suppressed, and the intensity of light reflected from the retroreflective object can be suppressed. Thus, even when the reflected light travels to the self-vehicle, impartment of glare to the driver of the self-vehicle can be suppressed. Accordingly, with the vehicle headlight 10, a reduction in driver's visibility can be suppressed.

In addition, in the vehicle headlight 10 of the present embodiment, the light source unit 30b that emits light emitted to the predetermined region AR among the plurality of light source units 30 includes the plurality of light emitting elements 35. The control unit 60 controls the light source unit 30b such that each of the light amount of light from some light emitting element 35-6 of the plurality of light emitting elements 35 and the light amount of light from other some light emitting element 35-7 of the plurality of light emitting elements 35 is reduced in a case where the determination unit 50 determines that the retroreflective object satisfies the predetermined requirement as compared with the case where the determination unit 50 determines that the retroreflective object does not satisfy the predetermined requirement.

With the vehicle headlight 10, in the state in which the retroreflective object satisfies the predetermined requirement, the irradiation of the retroreflective object with light is suppressed, and the intensity of the reflected light can be further suppressed as compared with the state in which the retroreflective object does not satisfy the predetermined requirement. Accordingly, with the vehicle headlight 10, a reduction in driver's visibility can be further suppressed.

In addition, in the vehicle headlight 10 of the present embodiment, the control unit 60 may control the light source unit 30 such that the light amount of light from some light emitting element 35-6 of the plurality of light emitting elements 35 is reduced and the light amount of light from other some light emitting element 35-7 of the plurality of light emitting elements 35 is the same in a case where the determination unit 50 determines that the retroreflective object satisfies the predetermined requirement as compared with the case where the determination unit 50 determines that the retroreflective object does not satisfy the predetermined requirement.

In a case where the retroreflective object satisfies the predetermined requirement and a case where the retroreflective object does not satisfy the predetermined requirement, when the light amount of light from other some light emitting element 35-7 is the same, the control unit 60 can perform the same control on the light emitting element 35-7 in both cases. For example, even when the state is switched from the case where the retroreflective object does not satisfy the predetermined requirement to the case where the retroreflective object satisfies the predetermined requirement, the control unit 60 may not need to change the amount of power supplied to the light emitting element 35-7. Accordingly, the control unit 60 can easily control the light emitting element 35-7 as compared with the case where the light amount of light from the light emitting element 35-7 changes in a case where the retroreflective object satisfies the predetermined requirement and a case where the retroreflective object does not satisfy the predetermined requirement.

Although the present invention has been described above by taking the aforementioned embodiments as an example, the present invention is not limited thereto.

In each of the above embodiments, the flowchart including Steps S1 to S5 has been described as an example, but the flowchart is not particularly limited.

The number of reflection blades 39a is not particularly limited.

It is sufficient if the reflector 39 repeats the periodic motion to reflect the light from the plurality of light source units 30 toward the projection lens 43 side, and scans the light in the left-right direction of the vehicle 100. The reflector 39 may be, for example, a mirror that is swingable about an axis parallel to the reflecting surface. In addition, for example, the reflector 39 may be a micro electro mechanical system (MEMS) mirror, and the drive unit 41 may be a resonator that is an actuator.

It is sufficient if the light source unit 30 of each embodiment is configured to emit light toward the reflector 39. In addition, similarly to the light source unit 30 of the first embodiment, the light source unit 30 of the second embodiment may further include at least one light emitting element different from the plurality of light emitting elements arranged in a row along the predetermined direction. In this case, the plurality of light emitting elements in the light source unit may be arranged side by side so as to form two or more rows in the predetermined direction.

In the light source unit 30b of the second embodiment, the light emitted from the light emitting element 35-6 may be the second light, and the light emitted from the light emitting element 35-7 may be the first light.

In the case of the configuration in which the light source unit 30b includes only one light emitting element, in a case where the determination unit 50 determines that the retroreflective object satisfies the predetermined requirement, it is sufficient if the control unit 60 controls the light source unit 30b such that the light amount of light from the one light emitting element 35 is reduced as compared with the case where the determination unit 50 determines that the retroreflective object does not satisfy the predetermined requirement.

In Step S5 of the second embodiment, the control unit 60 may control the light source unit 30b such that the light amount of light emitted from the light emitting elements 35-6 and 35-7 corresponding to the condensing spots SC6 and SC7 becomes zero during a period in which the condensing spots SC6 and SC7 pass through the non-irradiation region 211. Alternatively, the control unit 60 may control the light source unit 30b such that the light amount of light emitted from one of the light emitting element 35-6 and the light emitting element 35-7 becomes zero and the light amount of light emitted from the other of the light emitting element 35-6 and the light emitting element 35-7 becomes the second predetermined value other than zero.

In Step S5 of the second embodiment, in a case where the distance between the retroreflective object and the vehicle 100 is less than the predetermined distance, it is sufficient if the sum of the light amounts of light emitted to the predetermined region AR overlapping the retroreflective object in the second light distribution pattern 203 may be reduced as compared with the case where the distance between the retroreflective object and the vehicle 100 is equal to or more than the predetermined distance. When the sum of the light amounts decreases, for example, the control unit 60 may control the light source unit 30b such that the light amount of light emitted from one of the light emitting element 35-6 and the light emitting element 35-7 becomes the second predetermined value and the light amount of light emitted from the other of the light emitting element 35-6 and the light emitting element 35-7 becomes a predetermined value larger than the first predetermined value. Alternatively, the control unit 60 may control the light source unit 30*b* such that the light amount of light emitted from one of the light emitting element 35-6 and the light emitting element 35-7 becomes the second predetermined value and the light amount of light emitted from the other of the light emitting element 35-6 and the light emitting element 35-7 becomes the third predetermined value smaller than the second predetermined value.

In Step S5 of the second embodiment, the control unit 60 does not need to control the light emitting elements 35-6 and 35-7 such that the light amounts of light emitted from the light emitting elements 35-6 and 35-7 always become the second predetermined value during the light scanning period. For example, the control unit may control the light emitting elements 35-6 and 35-7 such that the light amount always becomes the second predetermined value in a certain scanning period of the scanning period. Alternatively, the control unit 60 may control the light emitting elements 35-6 and 35-7 such that the light amount always becomes the second predetermined value in a certain predetermined scanning period of the scanning period.

In addition, in Step S5 of the second embodiment, the control unit 60 may control the light source unit 30*a* such that the light amounts of light emitted from the light emitting elements 35-1 to 35-5 become the second predetermined value. Alternatively, the control unit 60 may control the light source unit 30*a* such that the light amount of light emitted from the light emitting elements 35-1 to 35-5 becomes a predetermined value larger than the first predetermined value. In this case, for example, the first predetermined value is 80% of the maximum value of the light amount, and the predetermined value larger than the first predetermined value is the maximum value of the light amount.

In the second embodiment, the control unit 60 detects the predetermined region AR where the retroreflective object overlaps in the second light distribution pattern 203 on the basis of the information from the detection device 110 and sets the predetermined region AR as the non-irradiation region 211, but does not need to be limited thereto. For example, the control unit 60 may detect the predetermined region AR where the face of a human overlaps in the second light distribution pattern 203 on the basis of the information from the detection device 110, and may set the predetermined region AR as the non-irradiation region 211.

In the second embodiment, it is described that the predetermined region AR overlaps the second light distribution pattern 203, but even when the predetermined region AR overlaps the first light distribution pattern 201, it is sufficient if the control unit 60 controls the light source unit 30*b* similarly to the case where the predetermined region AR overlaps the second light distribution pattern 203.

The configuration of the lighting tool 20*a* is the same as the configuration of the lighting tool 20*b*, but may be different from the configuration of the lighting tool 20*b*.

It is sufficient if the captured image is at least one of a moving image and a still image.

The detection device 110 detects the presence of the target object, the presence position of the target object, the type of the target object, or the like from the captured image captured by the camera, but does not need to be limited thereto. In a case where a millimeter-wave radar, a LiDAR, or the like capable of detecting a target object is mounted, the detection device 110 may detect the presence of the target object, the presence position of the target object, the type of the target object, or the like on the basis of a signal input from the millimeter-wave radar, the LiDAR, or the like. In addition, the detection device 110 may detect them on the basis of the captured image captured by the camera and the signal input from the millimeter-wave radar, the LiDAR, or the like. In addition, the calculation unit may calculate the distance between the retroreflective object and the vehicle 100 on the basis of the signal input from the millimeter-wave radar or the like. In addition, the detection device 110 may not identify or detect the retroreflective object and the human as a target object, and may detect one of the retroreflective object and the human. In addition, the signal indicating the retroreflective object or the human as a target object may be input to the control unit 60 from a configuration different from the determination unit 50, for example, the detection device 110.

In addition, the millimeter-wave radar transmits a millimeter wave to a target object and receives a reflected wave that has hit and been reflected from the target object. The millimeter-wave radar outputs a signal indicating a reception result to the calculation unit. The reception result may be included in the state of the target object. The calculation unit may calculate the distance between the vehicle 100 and the target object on the basis of the reception result input from the millimeter-wave radar.

In addition, the detection device 110 may include a stereo camera that captures an image of the front of the vehicle 100. The stereo camera includes two cameras, and outputs captured images captured by the respective cameras to the calculation unit. The captured image may be included in the state of the target object. The calculation unit may calculate the distance between the vehicle 100 and the target object on the basis of stereo matching for obtaining parallax in corresponding pixels that are pixels corresponding to each other in the two captured images. Accordingly, the calculation unit calculates the distance between the vehicle 100 and the target object on the basis of the captured images from the stereo camera.

In addition, the detection unit of the detection device 110 may detect a temporal change amount of the size of the target object in the captured image from the captured image on which the image processing is performed by the image processing unit. The change amount is included in the signal indicating the state of the target object. The change amount of the size of the retroreflective object 401 is smaller when the vehicle 100 away from the target object approaches the target object after a lapse of time, and the change amount of the size of the target object is larger when the vehicle moves forward and the vehicle 100 closer to the target object further approaches the target object after a lapse of time. The size of the target object indicates, for example, the area of the target object, the width of the target object, and the like. When detecting a target object located in front of the vehicle 100, the detection device 110 outputs a signal indicating the state of the target object such as the ratio of the target object in the captured image and the change amount to the calculation unit. The calculation unit may calculate the distance on the basis of the ratio and the change amount.

In addition, when the distance between, for example, the retroreflective object 401, which is a target object, and the vehicle 100 is less than the predetermined distance in a state where the light amount of light emitted from the pair of lighting tools 20 does not change, the intensity of the reflected light from the retroreflective object 401 to the self-vehicle tends to increase as compared with the state where the distance is equal to or more than the predetermined distance. By the way, in the vehicle headlight 10 of the present embodiment, the state that satisfies the predetermined requirement is a state in which the distance between, for example, the retroreflective object 401, which is a target object, and the vehicle 100 is less than the predetermined distance. In a case where the distance is less than the predetermined distance, the control unit 60 controls the pair of lighting tools 20 as described in the first embodiment or the second embodiment. Accordingly, when the distance is less than the predetermined distance, the intensity of the reflected light traveling from the retroreflective object 401 to the self-vehicle can be suppressed, the impartment of glare can be suppressed, and the reduction in driver's visibility can be suppressed, as compared with the state where the distance is equal to or more than the predetermined distance.

The predetermined requirement is not particularly limited, and may be an apparent size of the target object described above or the like instead of the distance. In a case where the predetermined requirement is the apparent size of the target object, the state that satisfies the predetermined requirement indicates a state in which the apparent size of the target object is equal to or more than a predetermined value. In this case, the detection unit of the detection device 110 detects the size of the target object in the captured image from the captured image on which the image processing is performed by the image processing unit as described above. The determination unit 50 determines whether the target object satisfies the predetermined requirement on the basis of the size of the target object. The predetermined value is recorded in the recording unit 70 as a threshold value, and may be changed according to the traveling status of the vehicle 100 such as daytime and nighttime. Even when the distance between the target object and the vehicle 100 is equal to or more than the predetermined distance, in a case where the apparent size of the target object is equal to or more than the predetermined value, there is a concern that a part of the light from the vehicle 100 travels from the target object to the vehicle 100 as reflected light and gives glare to the driver of the self-vehicle as compared with the case where the apparent size of the target object is less than the predetermined value. As described above, in a case where the state that satisfies the predetermined requirement is a state in which the apparent size of the target object is equal to or more than the predetermined value, the control unit 60 controls the pair of lighting tools 20 as described above. Accordingly, even in a case where the distance between the target object and the vehicle 100 is equal to or more than the predetermined distance and the apparent size of the target object is equal to or more than the predetermined value, the intensity of the reflected light traveling from the target object to the self-vehicle can be suppressed, the impartment of glare can be suppressed, and the reduction in driver's visibility can be suppressed. In the above description, the apparent size of the target object has been described, but the predetermined requirement may be the ratio of the target object in the captured image. In a case where the predetermined requirement is the ratio, the state that satisfies the predetermined requirement is a state in which the ratio is equal to or more than the predetermined value.

In the above description, the state that satisfies the predetermined requirement is a state in which the apparent size of the target object is equal to or more than the predetermined value, but does not need to be limited thereto. For example, the state that satisfies the predetermined requirement may be a state in which any one of the state in which the distance between the target object and the vehicle 100 is less than the predetermined distance, the state in which the apparent size of the target object is equal to or more than the predetermined value, and the state in which the ratio is equal to or more than the predetermined value described in the embodiments is combined.

The configuration of the detection device 110 may be included in the configuration of the vehicle headlight 10. In this case, the camera of the detection device 110 may be arranged inside the enclosure of the lighting tool 20.

When the retroreflective object no longer satisfies the predetermined requirement, the control unit 60 may set the region where the retroreflective object is no longer detected as the light amount non-change region 313 or the irradiation region 213.

As described above, according to the first embodiment of the present invention, the vehicle headlight that enables easy driving is provided, and the vehicle headlight can be used in the field of vehicle headlights such as of automobiles. In addition, according to the second embodiment of the present invention, the vehicle headlight capable of suppressing a reduction in driver's visibility is provided, and the vehicle headlight can be used in the field of vehicle headlights such as of automobiles.

The invention claimed is:

1. A vehicle headlight comprising:
a light source unit configured to include a plurality of light emitting elements;
a reflector configured to repeat a periodic motion to reflect light from the plurality of light emitting elements and scan the light to form a predetermined light distribution pattern; and
a control unit configured to control the light source unit, wherein
the predetermined light distribution pattern includes a superimposition region where light from at least two of the light emitting elements is superimposed on each other, and
in a case where a signal indicating that a target object located in front of a vehicle is detected is input from a detection device, the control unit controls the light source unit such that a light amount of light emitted from some light emitting elements to a predetermined region overlapping the target object does not change and a light amount of light emitted from other some light emitting element to the predetermined region overlapping the target object changes among the light emitting elements that emit light to the predetermined region overlapping the target object in the superimposition region;
the vehicle headlight further comprising
a determination unit that determines whether or not the target object satisfies a predetermined requirement that the light amount of reflected light from the target object is equal to or more than a predetermined value in a case where a signal indicating a state of the target object is input from the detection device,
wherein
each scanning region through which a spot of light from each light emitting element scanned by the reflector in the predetermined light distribution pattern passes is divided into a pair of end portions that includes an end in a scanning direction and is equal to or larger than a width of the spot in the scanning direction and a center portion sandwiched by the pair of end portions,
each of the scanning regions is arranged to be displaced in the scanning direction, a part of the center portion of each of the scanning regions overlaps a part of center portions of all the other scanning regions, and the end portion of each of the scanning regions does not overlap the end portion of all the other scanning regions, in a case where the predetermined region moves in the scanning direction from a first state in which the predetermined region is located in the center portion in all the scanning regions corresponding to the other some light emitting elements to a second state in which the predetermined region overlaps the end portion in at least one of the scanning regions corresponding to the other some light emitting elements and is located in the center portion in the scanning region corresponding to at least one of the light emitting elements among the some light emitting elements, the control unit controls the light source unit such that the light amount emitted to the predetermined region from the light emitting element corresponding to the scanning region in which the predetermined region overlaps the end portion in the other some light emitting elements returns to the light amount emitted to the predetermined region in a case where the determination unit does not determine that the target object satisfies the predetermined requirement, and the light amount emitted to the predetermined region in the second state becomes the light amount in the first state by changing the light amount emitted to the predetermined region from at least one of the light emitting elements corresponding to the scanning region in which the predetermined region is located in the center portion among some light emitting elements.

2. The vehicle headlight according to claim 1, wherein a width of the predetermined region in a left-right direction overlapping the target object changes according to a distance between the vehicle and the target object.

3. The vehicle headlight according to claim 1, wherein in a case where the target object is a human, the control unit controls the light source unit such that the light amount of light emitted from the other some light emitting elements to the predetermined region overlapping the target object increases.

4. The vehicle headlight according to claim 1, wherein in a case where the target object is a retroreflective object, the control unit controls the light source unit such that the light amount of light emitted from the other some light emitting elements to the predetermined region overlapping the target object decreases.

5. The vehicle headlight according to claim 1, wherein the control unit controls the light source unit such that the light amount of light emitted from the other some light emitting elements to the predetermined region overlapping the target object changes according to the distance between the vehicle and the target object.

6. The vehicle headlight according to claim 4, wherein the control unit controls the light source unit such that the light amount of light emitted from the other some light emitting elements to the predetermined region overlapping the target object decreases according to intensity of light from the target object to the vehicle.

7. The vehicle headlight according to claim 4, wherein the control unit controls the light source unit such that the light amount of light emitted from the other some light emitting elements to the predetermined region overlapping the target object decreases as an angle formed by a traveling direction of the vehicle and a direction from the vehicle toward the target object decreases.

8. The vehicle headlight according to claim 5, wherein in a case where a number of the light emitting elements that emit light to the predetermined region overlapping the target object is three or more, the control unit changes the number of the other some light emitting elements to change the light amount of light emitted from the other some light emitting elements to the predetermined region overlapping the target object.

9. The vehicle headlight according to claim 1, wherein the reflector is a rotary reflector that reflects light from the plurality of light emitting elements while rotating.

10. The vehicle headlight according to claim 1, wherein
the predetermined region in the second state is located in the center portion of the scanning region corresponding to two or more of the light emitting elements among the some light emitting elements, and
in a case of changing from the first state to the second state, the light amount emitted to the predetermined region from the light emitting element corresponding to the scanning region in which a distance between a center of the center portion in the scanning direction and the predetermined region is shortest among the two or more of the light emitting elements among the some light emitting elements changes.

11. The vehicle headlight according to claim 1, wherein a state that satisfies the predetermined requirement is a state in which the distance between the target object and the vehicle is less than a predetermined distance.

12. The vehicle headlight according to claim 1, wherein a state that satisfies the predetermined requirement is a state in which an apparent size of the target object is equal to or more than a predetermined value.

13. A vehicle headlight comprising:
a plurality of light source units;
a reflector configured to repeat a periodic motion to reflect light from the plurality of light source units and scan the light; and
a control unit configured to control the plurality of light source units,
wherein
the reflector reflects the light from the plurality of light source units such that a first light distribution pattern formed by scanning of light from some light source units among the plurality of light source units and a second light distribution pattern formed by scanning of light from other some light source units among the plurality of light source units partially overlap each other in an up-down direction of a vehicle, and
in a case where a signal indicating that a retroreflective object located in front of the vehicle is detected is input from a detection device, the control unit controls the plurality of light source units such that a light amount of light emitted to a predetermined region overlapping the retroreflective object in one of the first light distribution pattern and the second light distribution pattern is reduced as compared with a case where a signal indicating that the retroreflective object is not detected is input from the detection device;
the vehicle headlight further comprising
a determination unit that determines whether or not the retroreflective object satisfies a predetermined requirement that the light amount of reflected light from the retroreflective object is equal to or more than a predetermined value in a case where a signal indicating a state of the retroreflective object is input from the detection device, wherein
the light source unit that emits the light emitted to the predetermined region includes a plurality of light emitting elements, and
the control unit controls the light source unit such that each of the light amount of the light from some light emitting elements among the plurality of light emitting elements and the light amount of the light from other some light emitting elements among the plurality of light emitting elements is reduced in a case where the determination unit determines that the retroreflective object satisfies the predetermined requirement as compared with a case where the determination unit determines that the retroreflective object does not satisfy the predetermined requirement.

14. A vehicle headlight comprising:
a plurality of light source units;
a reflector configured to repeat a periodic motion to reflect light from the plurality of light source units and scan the light; and
a control unit configured to control the plurality of light source units,
wherein
the reflector reflects the light from the plurality of light source units such that a first light distribution pattern formed by scanning of light from some light source units among the plurality of light source units and a second light distribution pattern formed by scanning of light from other some light source units among the plurality of light source units partially overlap each other in an up-down direction of a vehicle, and
in a case where a signal indicating that a retroreflective object located in front of the vehicle is detected is input from a detection device, the control unit controls the plurality of light source units such that a light amount of light emitted to a predetermined region overlapping the retroreflective object in one of the first light distribution pattern and the second light distribution pattern is reduced as compared with a case where a signal indicating that the retroreflective object is not detected is input from the detection device;
the vehicle headlight further comprising
a determination unit that determines whether the retroreflective object satisfies a predetermined requirement that the light amount of light reflected from the retroreflective object is equal to or more than a predetermined value in a case where a signal indicating a state of the retroreflective object is input from the detection device,
wherein
the light source unit that emits the light emitted to the predetermined region includes a plurality of light emitting elements, and
the control unit controls the light source unit such that the light amount of the light from some light emitting elements among the plurality of light emitting elements is reduced and the light amount of the light from other some light emitting elements among the plurality of light emitting elements becomes same in a case where the determination unit determines that the retroreflective object satisfies the predetermined requirement as compared with a case where the determination unit determines that the retroreflective object does not satisfy the predetermined requirement.

15. The vehicle headlight according to claim 13, wherein a state that satisfies the predetermined requirement is a state in which a distance between the retroreflective object and the vehicle is less than a predetermined distance.

16. The vehicle headlight according to claim 13, wherein a state that satisfies the predetermined requirement is a state in which an apparent size of the retroreflective object is equal to or more than a predetermined value.

\* \* \* \* \*